(12) United States Patent  
Krajicek et al.

(10) Patent No.: US 9,410,409 B1  
(45) Date of Patent: Aug. 9, 2016

(54) THERMAL VAPOR STREAM APPARATUS AND METHOD

(71) Applicants: Richard W. Krajicek, Houston, TX (US); Robert J. Bakos, Wading River, NY (US); Dean P. Modroukas, Scarsdale, NY (US)

(72) Inventors: Richard W. Krajicek, Houston, TX (US); Robert J. Bakos, Wading River, NY (US); Dean P. Modroukas, Scarsdale, NY (US)

(73) Assignee: EOR Technology LLC, Houston, TX (US)

( * ) Notice: Subject to any disclaimer, the term of this patent is extended or adjusted under 35 U.S.C. 154(b) by 652 days.

(21) Appl. No.: 13/832,632

(22) Filed: Mar. 15, 2013

Related U.S. Application Data

(63) Continuation-in-part of application No. 12/539,205, filed on Aug. 11, 2009, now abandoned.

(51) Int. Cl.
*F02C 1/00* (2006.01)
*E21B 43/24* (2006.01)
*F22B 1/18* (2006.01)
*F02C 3/30* (2006.01)
*F02C 7/12* (2006.01)

(52) U.S. Cl.
CPC .......... *E21B 43/2406* (2013.01); *F22B 1/1853* (2013.01); *F02C 3/30* (2013.01); *F02C 7/12* (2013.01)

(58) Field of Classification Search
CPC ............... F02C 7/16; F02C 7/12; F02C 3/30; F01K 21/04
See application file for complete search history.

(56) References Cited

U.S. PATENT DOCUMENTS

| | | | |
|---|---|---|---|
| 2,218,281 A | 10/1940 | De Ridder et al. | |
| 2,359,108 A * | 9/1944 | Hoskins | 60/39.58 |
| 2,734,578 A | 2/1956 | Walter | |
| 2,754,098 A | 7/1956 | Heinze | |

(Continued)

FOREIGN PATENT DOCUMENTS

| | | |
|---|---|---|
| MX | 105472 | 12/1970 |
| MX | 106801 | 3/1971 |

OTHER PUBLICATIONS

Sperry, J., "Heavy-oil recovery system completes three field tests in Mid-continent region", Oil & Gas Journal, reprint from Jul. 27, 1981, PennWell Publishing Co.

(Continued)

*Primary Examiner* — Gerald L Sung  
(74) *Attorney, Agent, or Firm* — Locke Lord LLP

(57) ABSTRACT

A low-emission and environmentally-friendly apparatus and method is used to generate a high-pressure stream of thermal vapor. The thermal vapor stream may be injected into a subsurface petroleum-bearing formation for recovery of highly viscous petroleum or used to turn a steam turbine for driving an electrical generator. In one implementation, the high-pressure stream of thermal vapor is generated by burning a high-temperature fuel, including any short or long chain hydrocarbon products from methane to coal, in an enclosed vessel to produce combustion gases. Various cooling techniques, including regenerative cooling, may be employed to maintain the internal temperature of the vessel below a predefined safe level. The high-pressure thermal vapor stream may then be used to enhance recovery of highly viscous petroleum.

6 Claims, 19 Drawing Sheets

(56) References Cited

U.S. PATENT DOCUMENTS

| | | | |
|---|---|---|---|
| 2,793,497 A | 5/1957 | Walter | |
| 2,823,752 A | 2/1958 | Walter | |
| 2,839,141 A | 6/1958 | Walter | |
| 2,916,877 A | 12/1959 | Walter | |
| 3,359,723 A * | 12/1967 | Bohensky et al. | 60/775 |
| 3,620,571 A | 11/1971 | Billings | |
| 3,785,146 A * | 1/1974 | Bailey et al. | 60/39.53 |
| 3,846,981 A | 11/1974 | Paczkowski | |
| 3,948,323 A | 4/1976 | Sperry et al. | |
| 3,980,137 A | 9/1976 | Gray | |
| 3,993,135 A | 11/1976 | Sperry et al. | |
| 4,023,508 A * | 5/1977 | Cantrell et al. | 110/212 |
| 4,064,942 A | 12/1977 | Prats | |
| 4,113,017 A | 9/1978 | Hitzman | |
| 4,118,925 A | 10/1978 | Sperry et al. | |
| 4,156,421 A | 5/1979 | Cradeur et al. | |
| 4,244,684 A | 1/1981 | Sperry et al. | |
| 4,282,929 A | 8/1981 | Krajicek | |
| 4,327,805 A | 5/1982 | Poston | |
| 4,330,038 A | 5/1982 | Soukop et al. | |
| 4,397,356 A | 8/1983 | Retallick | |
| 4,398,604 A | 8/1983 | Krajicek et al. | |
| 4,454,917 A | 6/1984 | Poston | |
| 4,472,935 A | 9/1984 | Acheson et al. | |
| 4,488,866 A * | 12/1984 | Schirmer et al. | 431/4 |
| 4,546,829 A | 10/1985 | Martin et al. | |
| 4,667,739 A | 5/1987 | Van Meurs et al. | |
| 4,861,263 A * | 8/1989 | Schirmer | 431/158 |
| 4,955,191 A * | 9/1990 | Okamoto et al. | 60/39.3 |
| 5,054,279 A * | 10/1991 | Hines | 60/39.5 |
| 5,055,030 A * | 10/1991 | Schirmer | 431/10 |
| 5,238,066 A | 8/1993 | Beattie et al. | |
| 5,295,448 A | 3/1994 | Vickery | |
| 5,461,854 A * | 10/1995 | Griffin, Jr. | 60/775 |
| 5,535,591 A | 7/1996 | Priesemuth | |
| 5,784,875 A * | 7/1998 | Statler | 60/775 |
| 5,927,307 A | 7/1999 | King | |
| 6,289,666 B1 * | 9/2001 | Ginter | 60/775 |
| 7,299,868 B2 | 11/2007 | Zapadinski | |
| 2006/0053791 A1 * | 3/2006 | Prentice, III | 60/645 |

OTHER PUBLICATIONS

Bahng, S.H., International Search Report for International Patent Application No. PCT/US2010/045126, Korean Intellectual Property Office, dated Mar. 25, 2011.

Bahng, S.H., International Search Report for Written Opinion No. PCT/US2010/045126, Korean Intellectual Property Office, dated Mar. 25, 2011.

* cited by examiner

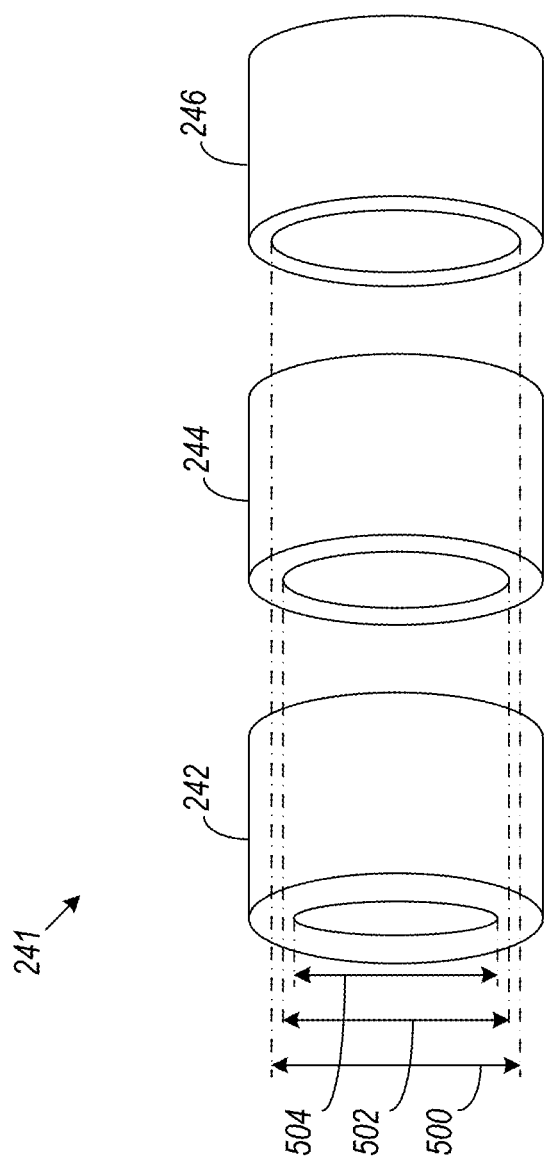

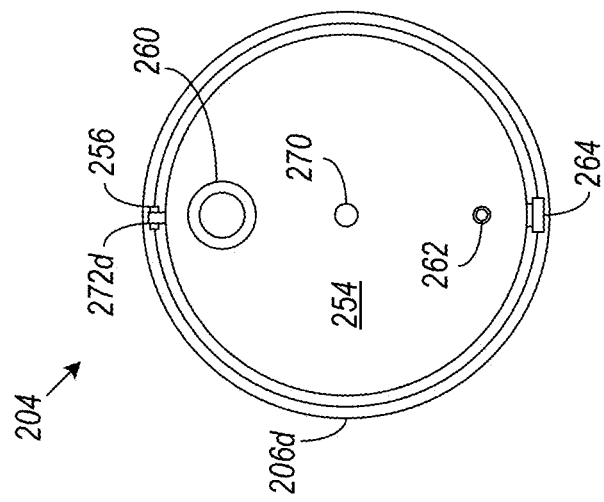
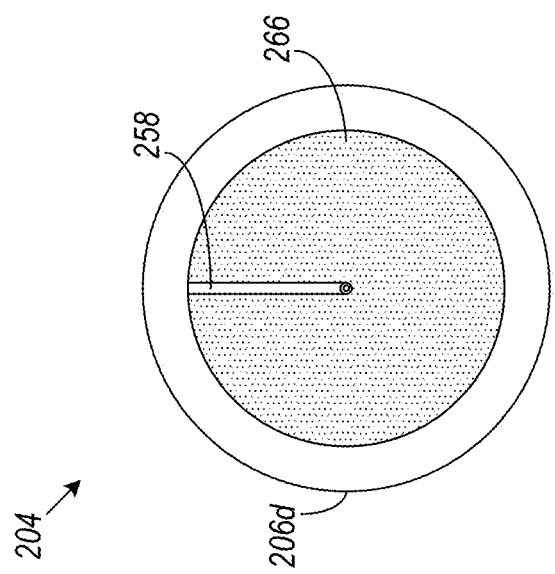

THERMAL VAPOR STREAM APPARATUS AND METHOD

CROSS REFERENCE TO RELATED APPLICATIONS

This application for patent is a continuation-in-part of U.S. Non-Provisional application Ser. No. 12/539,205, entitled "THERMAL VAPOR STREAM APPARATUS AND METHOD," filed Aug. 11, 2009, which is incorporated herein by reference in its entirety.

TECHNICAL FIELD OF THE INVENTION

Aspects of the invention relate generally to the use of a thermal vapor stream for cogeneration of electricity and heat and desirable gases, and for recovery of petroleum from a subsurface petroleum-bearing formation. More particularly, aspects of the invention relate to new and improved apparatuses and methods for producing a high-pressure thermal vapor stream that may be injected into the subsurface petroleum-bearing formation for recovering heavy viscous petroleum, or for sequestering the gases of combustion while producing electricity.

BACKGROUND OF THE INVENTION

Successful recovery of highly viscous petroleum using a high-pressure thermal vapor stream typically involves production of hot combustion gases and steam that are flowed into a steam generating device to produce large quantities of high-pressure thermal vapor or steam. The high-pressure thermal vapor or steam is thereafter injected into a subsurface petroleum-bearing formation to facilitate extraction of the highly viscous petroleum therefrom. This recovery process is commonly referred to by those having ordinary skill in the art as "huff and puff," steam flood, steam assisted gravity drainage (SAGD), and the like. Examples of apparatuses that may be used to produce a high-pressure thermal vapor stream are described in U.S. Pat. Nos. 4,156,421; 4,118,925; 3,980,137; 3,620,571; 2,916,877; 2,839,141; 2,793,497; 2,823,752; 2,734,578; 2,754,098; and 4,398,604; as well as Mexican Patents Nos. 105,472 and 106,801. Additionally, various methods for using such apparatuses are known in the art and include processes such as those disclosed in U.S. Pat. Nos. 3,993,135 and 3,948,323.

It is well known that in order to provide economical recovery of highly viscous petroleum, large volumes of thermal vapor must be generated and injected into the formation. This is particularly true, for example, where the thermal vapor is injected into the subsurface petroleum-bearing formation continuously over several hours, days, weeks, or even months. In addition, the thermal vapor must also be injected into the subsurface petroleum-bearing formation under pressures higher than the formation pressure in order for the thermal vapor to penetrate the formation. Moreover, certain highly viscous hydrocarbon deposits also require the application of large amounts of heat to reduce the viscosity and thus make recovery possible.

Because of the high volumes, pressures, and temperatures involved, difficulties often arise in obtaining, operating and maintaining the equipment and apparatuses needed for generating the required amounts of combustion gases that will produce the required amounts of steam under sufficiently high pressures and temperatures to provide satisfactory economic recovery of the highly viscous petroleum. For example, existing apparatuses that are capable of generating a suitable high-pressure thermal vapor stream tend to be large, heavy, and complex, and typically emit gases that are not environmentally friendly, all of which may result in additional costs to the petroleum recovery process. The environmentally harmful emissions from conventional equipment also make it difficult to use the high-pressure thermal vapor stream for other applications, such as cogeneration of electricity and heat.

Accordingly, what is needed is an improved apparatus and method for producing a high-pressure thermal vapor stream for injection into a subsurface petroleum-bearing formation to facilitate recovery of heavy viscous petroleum, for cogeneration of electricity and heat, and the like.

SUMMARY OF THE INVENTION

The disclosed embodiments relate to a low-emission and environmentally-friendly apparatus and method for generating a high-pressure stream of thermal vapor. The thermal vapor stream may be injected into a subsurface petroleum-bearing formation for recovery of highly viscous petroleum or used to turn a steam turbine for driving an electrical generator. In one implementation, the high-pressure stream of thermal vapor is generated by burning a high-temperature fuel, including any short or long chain hydrocarbon products from methane to coal, in an enclosed vessel to produce combustion gases. Various cooling techniques, including regenerative cooling, may be employed to maintain the internal temperature of the vessel below a predefined safe level. The high-pressure thermal vapor stream may then be used to enhance recovery of highly viscous petroleum.

In general, in one aspect, the disclosed embodiments relate to an apparatus for generating a high-pressure stream of superheated vapor, nitrogen, and carbon dioxide. The apparatus comprises an inlet section configured to receive fuel and air containing a stoichiometric or near stoichiometric amount of oxygen for the fuel, and a combustor section adjacent to and coaxial with the inlet section and configured to confine therein substantially stoichiometric combustion of the fuel and air to produce combustion gases.

The combustor section includes a tubular combustor body having an inner wall and an outer wall, a plurality of internal cooling channels extending along the length of the tubular combustor body between the inner wall and the outer wall of the combustor body, an upstream coolant manifold in fluid communication with the internal cooling channels and configured to receive and distribute coolant into the internal cooling channels, and a water line mounted within the tubular combustor body and configured to introduce water onto the combustion gases to produce superheated steam. An outlet section is adjacent to and coaxial with the combustor section, the outlet section having an outlet for allowing the superheated steam and combustion gases to exit the combustion chamber.

In general, in another aspect, the disclosed embodiments relate to a method of fracturing an oil-bearing formation. The method comprises producing a mixture composed of fine particles and a high-temperature detergent or a foaming chemical, pumping the mixture into a stream of superheated vapor and combustion gases under pressure, pressuring the mixture and the stream of superheated vapor and combustion gases to a predefined pressure, and injecting the pressurized mixture and stream of superheated vapor and combustion gases into the oil-bearing formation.

In general, in yet another aspect, the disclosed embodiments relate to a method of performing an enhanced oil recovery process. The method comprises generating a high-pressure stream of thermal vapor containing superheated vapor, nitrogen, and carbon dioxide, where the high-pressure stream of thermal vapor is generated by a jet vapor system composed of an inlet section configured to receive fuel and air containing a stoichiometric or greater amount of oxygen for the fuel, and a combustor section adjacent to and coaxial with the inlet section and configured to confine substantially stoichiometric combustion of the fuel and air to produce combustion gases.

The combustor section is composed of a tubular combustor body having an inner wall and an outer wall, a plurality of internal cooling channels extending along the length of the tubular combustor body between the inner wall and the outer wall of the combustor body, an upstream coolant manifold in fluid communication with the internal cooling channels and configured to receive and distribute coolant into the internal cooling channels, and a water line mounted within the tubular combustor body and configured to introduce water onto the combustion gases to produce superheated steam. An outlet section is adjacent to and coaxial with the combustor section, the outlet section having an outlet for allowing the superheated steam and combustion gases to exit the combustion chamber. The high-pressure stream of thermal vapor is then injected into an oil-bearing formation.

BRIEF DESCRIPTION OF THE DRAWINGS

The foregoing and other advantages of the invention will become apparent from the following detailed description and upon reference to the drawings, wherein:

FIG. 5 illustrates exemplary refractory sections for the jet vapor system of FIG. 2 according to the disclosed embodiments;

FIGS. 6A and 6B illustrate an exemplary quench section for the exemplary jet vapor system of FIG. 2 according to the disclosed embodiments;

DETAILED DESCRIPTION OF EXEMPLARY EMBODIMENTS

Figure 1:
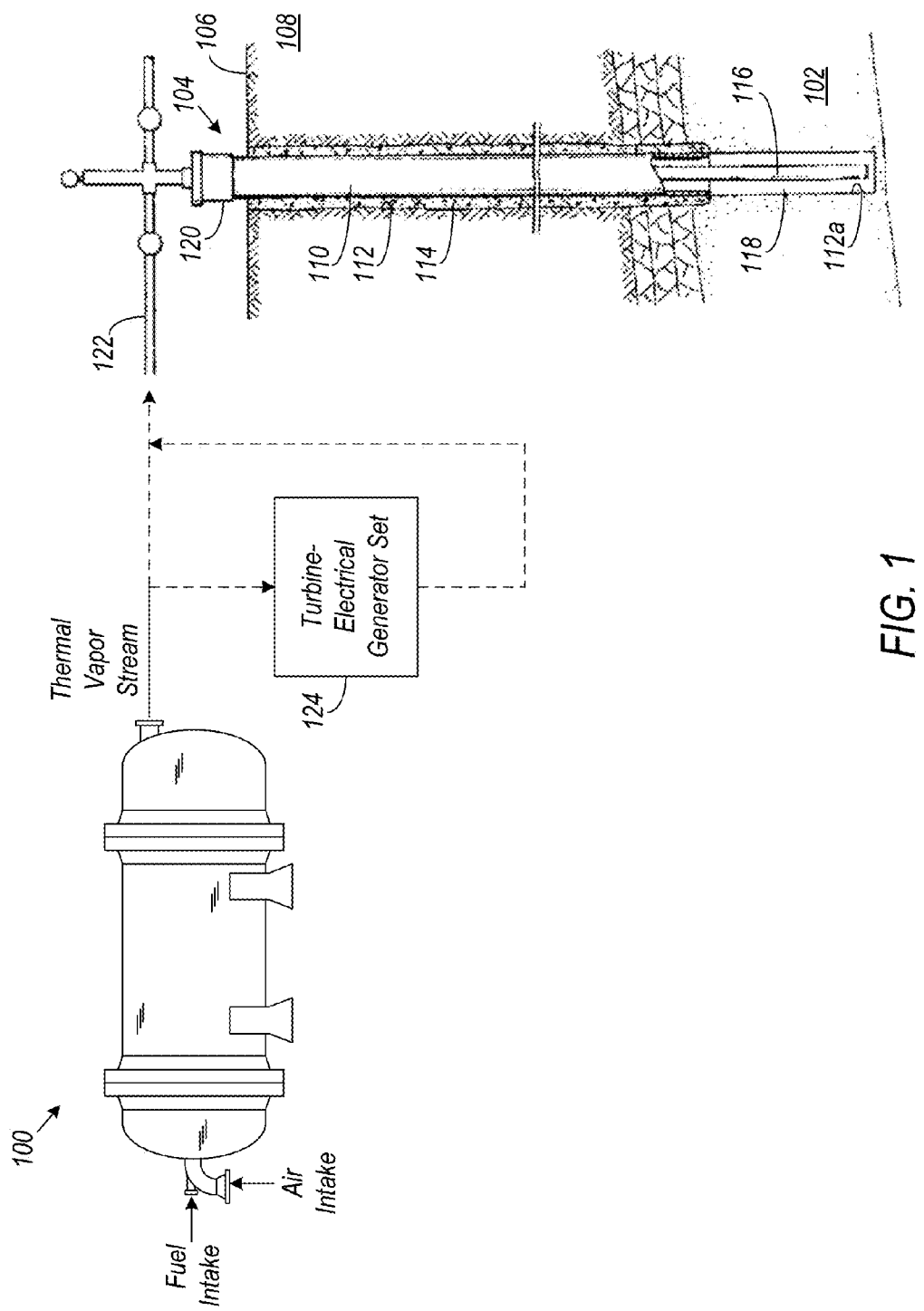
FIG. 1 illustrates an exemplary jet vapor system being used to generate a high-pressure thermal vapor stream according to the disclosed embodiments.

The drawings described above and the written description of specific structures and functions below are not presented to limit the scope of what has been invented or the scope of the appended claims. Nor are the drawings drawn to any particular scale or fabrication standards, or intended to serve as blueprints, manufacturing parts list, and the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

As mentioned above, aspects of the invention are directed to a new and improved apparatus and method for producing a high-pressure thermal vapor stream. The high-pressure thermal vapor stream may then be used in a variety of applications, including injection into a subsurface petroleum-bearing formation to facilitate recovery of heavy viscous petroleum. Aspects of the invention are particularly useful for economically and efficiently recovering heavy viscous petroleum having API gravities of less than about 22 API degrees and viscosities greater than about 150 centipoises (at 60 degrees Fahrenheit). Those having ordinary skill in the art will understand, however, that the inventive aspects described herein may be used to recover substantially any type of petroleum from substantially any type of subsurface petroleum-bearing formation. For example, aspects of the invention are also especially useful for recovering highly viscous petroleum from formations that have such low relative permeabilities to water and oil that they do not accept direct steam injection at pressures below formation fracture gradient pressures and high formation injection rates. These subsurface petroleum-bearing formations usually have an absolute permeability to air averaging in the range of about 50 to about 2000 millidarcy, but their relative permeabilities to water and oil may be less than one percent of the absolute permeability.

Referring now to FIG. 1, a jet vapor system 100 is shown that may be used to generate a high-pressure thermal vapor stream according to aspects of the invention. The high-pressure thermal vapor stream may then be used in various applications where such streams are useful, including enhanced oil recovery. In the example of FIG. 1, the high-pressure thermal vapor stream is injected into a subsurface petroleum-bearing formation 102 to facilitate recovery of heavy viscous petroleum. Specifically, the high-pressure thermal vapor stream is injected into a well 104 drilled through the surface 106 of the earth 108 and into the subsurface petroleum-bearing formation 102. The well 104 preferably has been completed in a conventional manner, which may include a string of casing 110 extending to the top of the subsurface petroleum-bearing formation 102 that is set within a bore hole 112 and supported by a high-temperature cement sheath 114.

Preferably, the bore hole 112 penetrates to near the bottom of the desired formation injection zone in the subsurface petroleum-bearing formation 102. The bore hole 112 may be left open, as in an open hole completion, or it may have a screen slotted liner or other perforated device (not shown) set in the lower end 112a of the bore hole 112 to support the walls of the bore hole 112. The well 104 may also include a string of tubing 116 disposed within the casing 110 to thereby form an annulus 118 therebetween, with the bore hole 112 extending through the formation 102. In preferred implementations, the string of tubing 116 extends downwardly to near the lower end 112a of the bore hole 112. Although not expressly shown, a packer may be provided in the annulus 118 at the lower portion thereof to seal off that end of the annulus 118 from the bore hole 112 in some embodiments.

A well head 120 and conventional sealing device (not shown) is provided adjacent the top of the well 104 to seal off the top of the annulus 118 and maintain pressure within the well 104. The jet vapor system 100 may then be connected to the well head 120 by a flow line 122 to provide a high-pressure thermal vapor stream for recovering the heavy viscous petroleum from the subsurface petroleum-bearing formation 102. In some implementations, the high-pressure thermal vapor stream may be provided to a gas turbine-electrical generator set 124 for cogeneration of electricity and heating fuel, water, and/or other material as needed. Thermal vapor from the gas turbine-electrical generator set 124 may then be provided to the flow line 122 for injection into the subsurface petroleum-bearing formation 102. Similarly, although not expressly shown, other applications for the high-pressure thermal vapor stream may include driving sterling cycle generators, compact rankine cycle generators, and the like.

Figure 2:
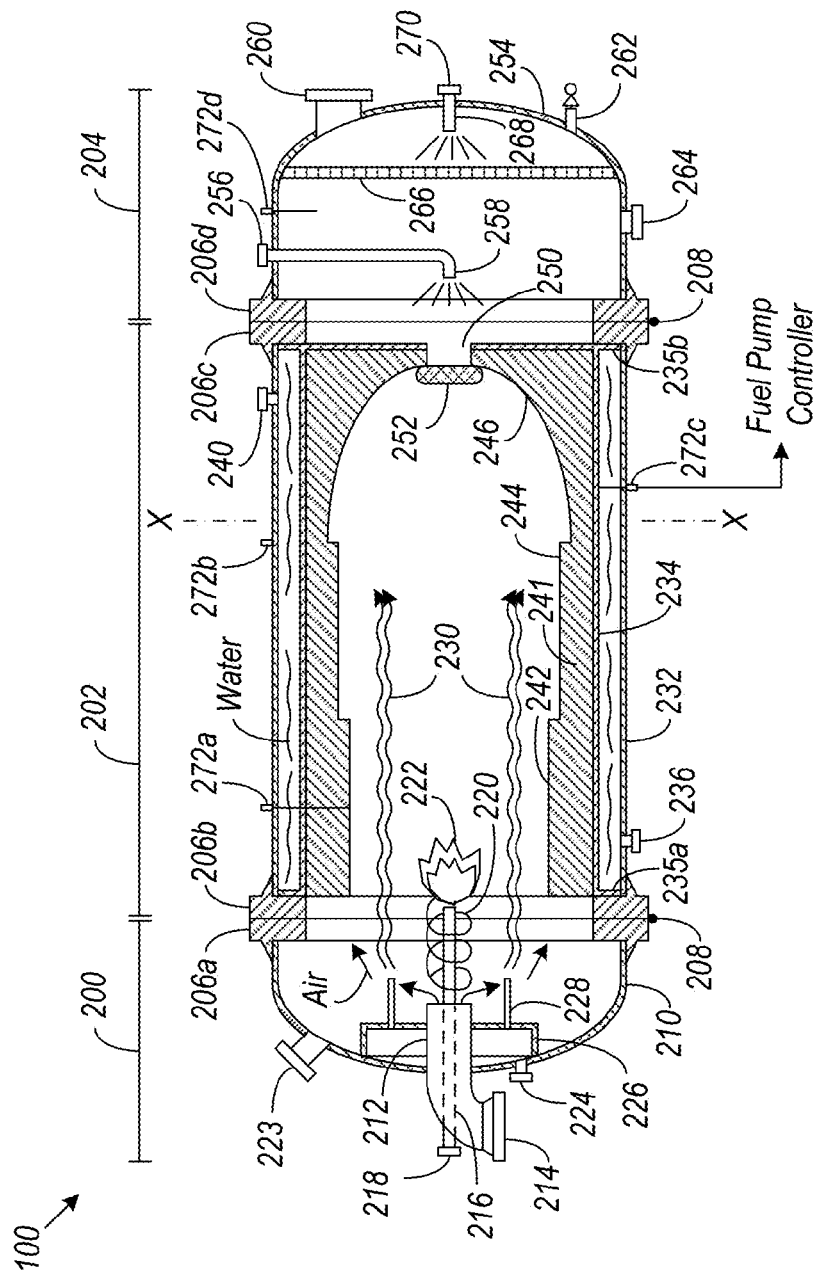
FIG. 2 illustrates the exemplary jet vapor system in more detail according to the disclosed embodiments.

FIG. 2 shows the jet vapor system 100 in more detail according to aspects of the invention. As can be seen, the jet vapor system 100 has three generally tubular sections, namely, an intake section 200, a combustion section 202, and a quench section 204. These sections 200-204, when coaxially connected as shown in FIG. 2, form an enclosed vessel of approximately six to eight feet (and preferably about seven feet) in outer length and approximately 20 to 40 inches (and preferably about 30 inches) in outer diameter. Those having ordinary skill in the art will understand, however, that other dimensions besides the particular ones mentioned here may be used for the jet vapor system 100 without departing from the scope of the disclosed embodiments.

In some embodiments, flanges 206a, 206b, 206c, 206d or similar mating components may be formed or otherwise attached (e.g., welded, brazed, etc.) to the openings in the sections 200-204 for allowing the sections 200-204 to be connected (i.e., bolted, riveted, etc.) to one another. The flanges 206a-d may be made of a material that is strong enough to withstand the high pressures inside the jet vapor system 100 as well as provide a watertight and airtight seal. An example of a flange that may be used is an ANSI (American National Standards Institute) Class 300 raised face weld neck flange made of a carbon or stainless steel material and complying with ASME (American Society of Mechanical Engineers) Standard SA-105. A gasket (not expressly shown) may also be used in conjunction with the flanges 206a-d to help achieve watertight and airtight sealing in some embodiments. One or more hinges 208 may also be provided for joining adjacent ones of the flanges 206a-d on some or all of the sections 200-204 in some implementations to allow the intake and quench sections 200 and 204 to swing open, for example, for maintenance and repair of the jet vapor system 100.

Referring still to FIG. 2, each of the various sections 200-204 will now be described in more detail. The intake section 200, as the name implies, acts as an intake for the jet vapor system 100, taking in air, fuel, and water, and the like. In some implementations, the intake section 200 may be made of a hemispherical or bowl shaped head 210, although an intake head 210 having a flat or even exterior may also be used in some embodiments. Where a curved intake head 210 is used, the intake head 210 may have a major-to-minor axis ratio of, for example, approximately 2:1, 2.5:1, 2:1.5, and the like. In any case, the intake head 210 should be made of a carbon or stainless steel material that satisfies, for example, ASME Standard SA-516-70 or similar standards. Such an intake head 210 may have a nominal thickness of approximately 0.5 to 1 inches and preferably about 0.625 inches, but other thicknesses may certainly be used as appropriate for the particular application.

An air line 212 may be provided in the intake head 210 extending into and stopping generally at the center of the intake head 210 for taking in air from an external air supply (not expressly shown) into the jet vapor system 100. The air line 212 may be a straight section of pipe in some embodiments, or it may be curved so that the portion of the air line 212 external to the jet vapor system 100 resembles a pipe elbow. An air intake 214 may then be attached to the air line 212 for coupling it to an air nozzle or similar air supply connector. The specific structure and operation of the air line 212 and air intake 214 are well known to those having ordinary skill in the art and will therefore not be described in detail here. Pressurized air from the external air supply may then be flowed into the jet vapor system 100 through the air line 212. The air may thereafter be used to burn a high-temperature fuel, including any short or long chain hydrocarbon products, from methane to coal, as well as synthetic gas, which is a mixture of hydrogen and carbon monoxide, and the like in the jet vapor system 100.

Fuel may be provided from an external fuel supply (not expressly shown) via a fuel line 216 in the intake head 210. Such fuel may be provided at a rate of one gallon per minute, for example, and is preferably atomized using standard techniques into a fine mist for improved combustion. The fuel line 216 may extend through the intake head 210 and end just inside the combustion section 202. The fuel line 216 may be disposed within and preferably coaxial with the air line 212 to facilitate mixing of the fuel and air together within the jet vapor system 100. A fuel intake 218 may be attached to the fuel line 216 in order to couple the fuel line 216 to a fuel nozzle or similar fuel supply connector. In the specific embodiment of FIG. 2, the fuel intake 218 protrudes from the air line 212 at the curved portion thereof so that neither intake obstructs operation of the other intake, but alternative intake arrangements may of course be employed by those having ordinary skill in the art.

It is also possible to rotate or swirl the air passing through the air line 212 in some embodiments using, for example, vanes (not expressly shown) provided on the interior of the air line 212. The vanes help create turbulence 220 and recirculation to thereby improve the mixing of the fuel and air in order to achieve more complete combustion, indicated generally by a flame 222. More complete combustion may also be accomplished by adding a small amount of water to the fuel, for example, approximately two to eight percent and preferably about five percent water. The water instantly and violently evaporates upon contact with the flame 222, resulting in a more complete combustion (but also lowering the temperature of the flame 222). An igniter port 223 may be installed on the intake head 210 at about a 45 degree angle to allow an operator to ignite the flame 222.

Finally, a water intake 224 may also be provided on the intake head 210 for taking in water from an external water supply (not expressly shown) into the jet vapor system 100. The water intake 224, similar to the air intake 214 and the fuel intake 218, may be designed for coupling to a water nozzle or similar water supply connector in a manner known to those having ordinary skill in the art. Water under pressure from the external water supply is received through the water intake 224 into an intake manifold 226 mounted on the interior of the intake head 210. The intake manifold 226, in some embodiments, may be two to three inches deep with a 12 to 15 inch outer diameter and made of an ASME Standard SA-53 carbon or stainless steel material that is welded to the intake head 210.

Water enters the intake manifold 226 at a rate of, for example, 20 gallons per minute, and is forced through a plurality of water nozzles 228 protruding from the intake manifold 226 toward the combustion section 202. The water nozzles 228, which may extend anywhere from just barely beyond the intake manifold 226 to all the way into the combustion section 202, spray jets of water 230 into the combustion section 202 that can form a water cone or curtain substantially surrounding the flame 222. The jets of water 230 serve as a heat barrier to lower the temperature around the flame 222 (without cooling the flame temperature) to thereby prevent the structural material of the jet vapor system 100, and particularly the combustion section 202, from exceeding certain temperature thresholds.

With respect to the combustion section 202, this is the section of the jet vapor system 100 where combustion of the fuel and air taken in by the intake section 200 may take place to produce combustion gases. As such, the temperature within the combustion section 202 can become extremely hot, depending on the type of fuel used. For example, a temperature of 3,500 to 4,000 degrees Fahrenheit may be reached when performing a stoichiometric combustion of certain types of hydrocarbon products. It is therefore important for safety and other reasons to ensure that the enormous amount of heat generated in the combustion section 202 does not compromise the structural integrity of the jet vapor system 100.

With reference again to FIG. 2, the combustion section 202 may be composed of a combustion housing 232 that resembles a section of pipe (e.g., an ANSI Schedule 80 pipe) or hollow cylinder in some embodiments. The combustion housing 232 basically operates as a combustion chamber and may be made of the same or a similar carbon or stainless steel material as the intake head 210 described above. This combustion housing 232 may also have approximately the same outer diameter and thickness as the intake head 210, and may be approximately three to five feet or longer, and about four feet long typically. In some embodiments, rather than a specific diameter and length, the combustion housing 232 may have a particular a length-to-diameter ratio (L/D) instead. Typically, a length-to-diameter ratio of from 4:1 up to 8:1 may suffice depending on the fuel used and other conditions. Of course, other types of materials, dimensions, shapes, and the like may be used for the combustion housing 232 by those having ordinary skill in the art based on the requirements of a particular application without departing from the scope of the disclosed embodiments.

A coolant manifold 234 may be provided on the inner surface of the combustion housing 232 for cooling purposes. Like the combustion housing 232, the coolant manifold 234 may be an approximately three to five feet or longer (and preferably about four feet) section of pipe or hollow cylinder made of a similar carbon or stainless steel material, but with flanges 235a and 235b formed or otherwise attached to the ends thereof. The flanges 235a and 235b may have an outer diameter that allows them to fit flush inside and coaxially with the combustion housing 232, leaving an annular space of about two to three inches between the combustion housing 232 and the coolant manifold 234. A cooling fluid, such as water, may then be pumped from an external coolant supply (not expressly shown) through one or more coolant inlets 236 provided on the combustion housing 232 to fill the annular space with coolant (see wavy lines). The coolant helps keep the temperature on the combustion housing 232 from exceeding certain predefined thresholds. One or more coolant outlets 240 may be provided on the combustion housing 232 to allow the coolant in the annular space formed by the combustion housing 232 and the coolant manifold 234 to exit and be circulated.

In some embodiments, as a safety measure, the coolant manifold 234 may have a smaller thickness and/or may be made of a weaker material than the combustion housing 232. As a result, the structural integrity of the coolant manifold 234 may be compromised first, causing the coolant manifold 234 to fail before failure of the combustion housing 232, in the event of an unexpected temperature spike. This allows the coolant being retained by the coolant manifold 234 to escape into the interior of the combustion housing 232 and thereby snuff or extinguish the flame 222 before the structural integrity of the combustion housing 232, and hence the jet vapor system 100, can be compromised.

In addition to the coolant manifold 234, a refractory 241 having one or more refractory sections 242, 244, and 246 may be provided in the combustion housing 232 to help withstand the high-temperatures in the combustion section 202. In some embodiments, the refractory 241 may be a kiln-dried refractory cast as a single unitary cartridge, although it is also possible to use three discrete and separately removable sections 242-246 for the refractory 241. Examples of a suitable refractory 241 may be obtained from Diamond Refractory Services and Huber Construction Company, both of Houston, Tex., as well as other refractory vendors. Materials that may be used for constructing a suitable refractory 241 may be obtained from Able Refractory Products, also of Houston, Tex. Zirconia and yttria-stabilized zirconia (YSZ) are other examples of refractory material that may be employed to make castable and insertable or brick-lined refractories for modular steam generators like the jet vapor system described herein for use in heavy oil extraction.

Although three refractory sections 242-246 are shown in FIG. 2, it is possible to use a single section, two sections, or more than three refractory sections in some implementations. Any suitable refractory material known to those having ordinary skill in the art may be used for the refractory sections, including alumina, silica, and magnesia. By way of an example, a refractory material containing approximately 60 percent alumina, 30 percent silica, and 10 percent inert other ingredients has been found to be effective in some embodiments. But instead of laying pre-sintered bricks of refractory material to build the refractory 241, or spraying a refractory material on the coolant manifold 234 that must then be sintered, the refractory 241 (or each refractory section 242-246) is preferably precast as a discrete, unitary component that is ready to be used and may be handled as a single piece. This allows the refractory 241 (or each refractory section 242-246) to be more easily installed in and removed from the combustion section 202 as needed, for example, when performing maintenance and repair on the jet vapor system 100.

The refractory 241 may be generally tubular in shape and each refractory section 242-246 may have an outer diameter that allows the refractory 241 to fit in the combustion section 202 coaxially within the coolant manifold 234. This results in the refractory 241 having an outer diameter of approximately 23 to 25 inches (and preferably about 24 inches) in some embodiments. A small annular gap (about $\frac{1}{16}$ inch, not expressly shown) may be provided between the refractory 241 and the coolant manifold 234 in some embodiments to allow air from the air line 214 to enter and flow in between the coolant manifold 234 and the refractory sections 242-246. This air flow in the small annular gap helps balance against the pressure exerted on the other side of the refractory 241 from the combustion gases flowing through the interior of the combustion section 202.

The use of the refractory 241 within the jet vapor system 100 is intended to lower the temperature in the combustion section 202 from between 3,000 to 3,400 degrees Fahrenheit and higher, to about 600 degrees Fahrenheit at or near the inner surface of the coolant manifold 234. According to some estimates, depending on the properties of the refractory and operating conditions within the combustion housing 232, a minimum refractory thickness of about four inches is needed to accomplish the above temperature reduction. Thus, in most embodiments, each of the refractory sections 242-246 (assuming more than one refractory section) is at least four inches thick. Note that the temperature at or near the flame 222 may actually be higher than the refractory limit of 3,400 degrees Fahrenheit for certain fuels, but the jets of water 230 from the water nozzles 228 are expected to bring this temperature down to about 3,400 degrees Fahrenheit (or less) at or near the interior surface of the refractory sections 242-246 (without lowering the temperature of the flame 222).

In accordance with aspects of the invention, one or more of the refractory sections 242-246 may have a thickness that is different from another one of the refractory sections 242-246. For example, following in the direction of flow of the combustion gases (i.e., left to right), each refractory section 242-246 may have a smaller thickness than the immediately preceding refractory section 242-246, resulting in a larger opening at each refractory section 242-246. In one implementation, the first refractory section 242 may have a thickness of about six inches, whereas the next refractory section 244 may have a thickness of about five inches, and so on. Each stepwise decrease in refractory thickness has the effect of suddenly decreasing the velocity of the combustion gases flowing through that refractory section 242-246 relative to the preceding refractory section 242-246. The sudden drop in velocity, in turn, creates or increases turbulence in the combustion gases that causes heat to be more evenly distributed throughout the combustion section 202. This arrangement also allows the refractory sections 242-246 to serve as stabilization zones that function to maintain or hold the flame close to the burner. To this end, although not expressly shown, in some embodiments, the burner may use a bluff body to stabilize the flame and reduce the length of flame.

In some embodiments, the last refractory section 246 that the combustion gases flow through before entering the quench section 204 may serve as a sort of nozzle to funnel the combustion gases toward the quench section 204. To this end, the refractory section 246 may have a thickness that is smaller at one end and increases going toward the other end (the end adjacent to the quench section 204). By way of an example, the refractory section 246 may have a thickness of about four inches at the end furthest away from the quench section 204, and this thickness may increase to about nine inches at the end closest to the quench section 204. The increase in thickness may be a linear increase (resulting in a cone shaped nozzle), or it may be an exponential increase (resulting in a bowl shaped nozzle) similar to the one shown in FIG. 2. In either case, the increased thickness leaves only a small passageway 250 of about five to seven inches in diameter (and preferably about six inches) in the refractory section 246 for the combustion gases to flow through to the quench section 204 (hence, creating a funnel effect).

In some embodiments, the flange 235*b* of the cooling manifold 234 (i.e., the one adjacent to the quench section 204) may extend radially inward a suitable distance to provide backing support for the refractory 241. A mesh-type high-temperature catalytic converter 252 may be removably disposed (e.g., via hooks, etc.) over the passageway 250 to convert or reduce any unwanted emissions (e.g., turn carbon monoxide to carbon dioxide, etc.) that may result from incomplete combustion of the fuel and air before the combustion gases enter the quench section 204.

The quench section 204, like the intake section 200, may include a head 254 that is similar in material and dimensions to the intake head 210 except that it may be longer (e.g., two to three feet in length). This quench head 254 may have a quench intake 256 for taking in water from an external water supply (not expressly shown) to quench the combustion gases. Such a quench intake 256 may be designed to couple with a water nozzle or similar water supply connector in a manner known to those having ordinary skill in the art. Water under pressure from the external water supply flows into the quench intake 256 through a water line 258 that introduces (e.g., by spraying) the water directly into the passageway 250 to quench any combustion gases entering the quench section 204. The water may be sprayed fairly evenly in a round or circular pattern that may extend approximately two or more inches around the circumference of the passageway 250. The introduction of the water onto the combustion gases heats the water into superheated steam or vapor (e.g., about 600 to 750 degrees Fahrenheit).

In some embodiments, the quench intake 256 and the water intake 224 may be connected to or otherwise be in fluid communication with each other and/or to the same external water supply. Indeed, where the coolant used in the coolant manifold 234 is water, the coolant inlet 236 may also be connected to or otherwise in fluid communication with water intake 224, the quench intake 256, and/or the same external water supply. In some embodiments, certain chemicals well known to those having ordinary skill in the art may be added to the water supply to convert any unwanted gases into a soluble substance that may subsequently be removed.

A vapor outlet 260 provided on the quench head 254 allows the superheated steam or vapor to exit the jet vapor system 100. The vapor outlet 260 may then be connected to the flow line 122 (see FIG. 1) for carrying the superheated steam or vapor into the subsurface petroleum-bearing formation 102, or to the gas turbine-electrical generators set 124 for cogeneration of heat and electricity. In some embodiments, a relief valve 262 may be provided in the quench head 254 to release excess pressure from the jet vapor system 100. A drain 264 may also be provided in the quench head 254 for removing any solids or particulates that collect on the bottom of the quench head 254. Finally, where coal powder or a similar combustion material is used as fuel, a filter 266 may be removably mounted in front of the vapor outlet 260 to capture any fly ash that may be present as a result of burning the coal powder or similar combustion material. In these embodiments, a backflush nozzle 268 may be provided to back spray water from a water intake 270 onto the filter 266 to flush or wash the fly ash from the filter 266. The backflushed fly ash may then be periodically collected and removed via the drain 264 as needed.

In some embodiments, a plurality of thermocouples or other temperature sensing devices may be provided at various locations on the jet vapor system 100 for monitoring and regulating the temperature throughout the jet vapor system 100 as needed. For example, a thermocouple 272a may be provided on the combustion housing 232 and configured for sensing the temperature on the refractory 241. Another thermocouple 272b may be provided on the combustion housing 232 and configured for sensing the temperature on the combustion housing 232 itself. Yet another thermocouple 272c may be provided on the combustion housing 232 and configured for sensing the temperature on the coolant manifold 234. Still another thermocouple 272d may be provided on the quench head 254 and configured for sensing the temperature on or inside the quench head 254. The output of these thermocouples 272a-d may be fed to various temperature-based monitoring devices for monitoring and regulating the temperature throughout the jet vapor system 100 as needed. In one implementation, the output of the thermocouple 272c for the coolant manifold 234 may be connected to a fuel pump control unit that is configured to shut off fuel to the intake section 200 if the temperature on the coolant manifold 234 exceeds a certain predefined threshold (e.g., 600 degrees Fahrenheit). In another implementation, the output of the thermocouple 272d on the quench head 254 may be connected to a water pump control unit (not expressly shown) that is configured to increase the amount of water sprayed on the combustion gases if the temperature inside the quench head 254 exceeds a certain predefined threshold (e.g., 600 degrees Fahrenheit).

Basic operation of the jet vapor system 100 will now be described. In general, fuel is injected into the jet vapor system 100 via the intake section 200 at about 2,000 psi (pounds per square inch) from an external fuel supply through the fuel intake 218. At the same time, a stoichiometric or greater amount of air is pumped into the jet vapor system 100 from about 500 psi to about 2000 psi (and preferably about 800 psi) from an external air supply through the air intake 214. Techniques for regulating the flow of fuel and air are well known to those having ordinary skill in the art and will therefore not be described here. The air and fuel are mixed together, ignited, and burned in the combustion section 202 to produce a hot mixture of combustion gases, primarily nitrogen, carbon dioxide, and water (or superheated steam), with small amounts of nitrogen oxides and sulfur oxides (where sulfur is present in the fuel used). Note that although a stoichiometric combustion is expected, those having ordinary skill in the art understand that in practice, the combustion may sometimes be only "substantially" stoichiometric, meaning that there may be a small amount of unburned material (e.g., less than one percent) remaining in some cases.

The type of fuel used, in some embodiments, is crude oil or a mixture of crude oil and diesel, although diesel by itself may also be used as well as kerogen, coal powder, and other short and long chain hydrocarbon products. A small amount of water may be added to the fuel in some embodiments, for example, around two to eight percent and preferably about five percent water, to enhance the combustion and also lower the temperature of the flame 222. As mentioned earlier, the jets of water 230 from the water nozzles 228 form a sort of moving cone or curtain of water around the flame 222 that helps lower the temperature of the refractory sections 242-246 (e.g., to about 3,400 degrees Fahrenheit). The jets of water 230 naturally need to be sprayed at a higher pressure than the pressure of the incoming air, preferably at about 100 psi relative to the combustor pressure.

When the combustion gases flow over the refractory sections 242-246, the decreasing thickness of each refractory section 242-246 reduces the pressure of the combustion gases, creating or increasing turbulence that causes the heat in the combustion gases to be more evenly distributed. The combustion gases are then funneled toward the passageway 250 where the mesh-type high-temperature catalytic converter 252 converts or reduces any unwanted emissions (e.g., carbon monoxide to carbon dioxide, etc.) that may result from incomplete combustion of the fuel and air. At the passageway 250, the pressure (hence, velocity) of the combustion gases increases back up to about 500 psi due to the smaller diameter of the passageway 250.

As the combustion gases pass through the passageway 250, a sufficient amount of water is introduced (e.g., sprayed, etc.) directly onto the combustion gases from the water line 258 to produce superheated steam or vapor that reduces the temperature in the quench section 204 to about 600 to 750 degrees Fahrenheit. In some embodiments, corrosion-controlling chemicals well known to those having ordinary skill in the art may be added to the water from the water line 258 to convert the nitrogen oxides and any sulfur oxides in the combustion gases to soluble salts. The soluble salts and any earth alkali metal compounds that may be present may then be removed periodically via the drain 264. The superheated steam or vapor, nitrogen, and carbon dioxide may then be injected into a subsurface petroleum-bearing formation for recovery of highly viscous petroleum, used for cogeneration of electricity and heat, or as an energy source in other suitable applications.

As mentioned above, coal may be used as the fuel in some embodiments. The coal may be burned by itself, or it may be burned together with a liquid hydrocarbon, for example, diesel fuel. In one implementation, coal powder may be made into slurry by mixing the coal powder with the diesel fuel, then injecting the slurry mixture into the jet vapor system 100. Alternatively, coal dust may be mixed with the pressurized air and pumped into the jet vapor system 100. In either case, the combustion gases produced by burning the coal powder or dust may then be sequestered below ground by injecting the combustion gases into the subsurface petroleum-bearing formation 102 (see FIG. 1). For these coal burning implementations, the filter 266 helps to minimize any fly ash produced from the coal. This novel application of the jet vapor system 100 allows coal, which is a known source of acid rain, smog, and other pollutants, to be used as a fuel for enhanced hydrocarbon recovery, electricity and heat cogeneration, or other applications in a clean and environmentally-responsible manner. Other gaseous fuels that may be used may include natural gas, hydrogen, synthetic gas, and the like.

Figure 3B:
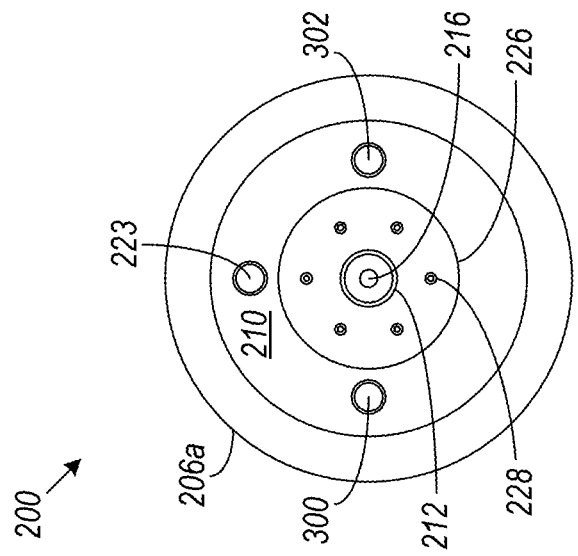
FIGS. 3A and 3B illustrate an exemplary head section for the jet vapor system of FIG. 2 according to the disclosed embodiments.
Figure 3A:
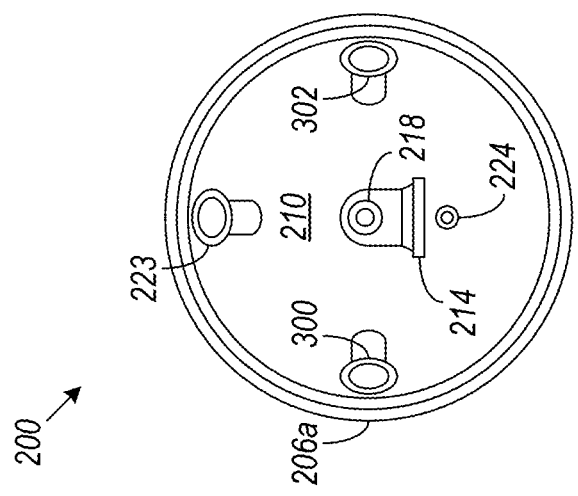

Turning now to FIGS. 3A-3B, a view of the intake section 200 from the back end (FIG. 3A) and the front end (FIG. 3B) thereof is shown. As can be seen in FIG. 3A, in addition to the previously described air intake 214, fuel intake 218, igniter port 223, and water intake 224, the intake head 210 may also have one or more additional ports provided thereon. For example, the intake head 210 may have an eye port 300 for viewing and visually examining the flame 222 in some embodiments. The eye port 300 may be similar in size, shape, and angle as the igniter port 223, or it may be different in one or more of those aspects, as deemed appropriate by those having ordinary skill in the art. Similarly, the intake head 210 may also have a flame shutdown port 302 in some embodiments for allowing an operator to manually extinguish or snuff the flame 222 as needed.

FIG. 3B shows in more detail the water nozzles 228 used for spraying the jets of water 230 that generate the cone of water around the flame 222. In one implementation, there may be six water nozzles 228 spaced evenly on the intake manifold 226 around the fuel line 216 so as to form a circular pattern having a diameter of around eight to 10 inches and preferably about nine inches. Of course, fewer or more than six nozzles may also be used depending on the particular needs of the application. The water nozzles 228 may have any size, shape, and spray pattern capable of producing a cone or curtain of water that substantially surrounds the flame 222 and is either coterminous with or extends beyond the flame 222 by a predetermined amount (e.g., six inches to one foot). As noted above, the pressure with which the water nozzles 228 spray the jets of water 230 should be greater than the pressure with which air is pumped into the jet vapor system 100 (e.g., about 600 psi).

Figure 4A:
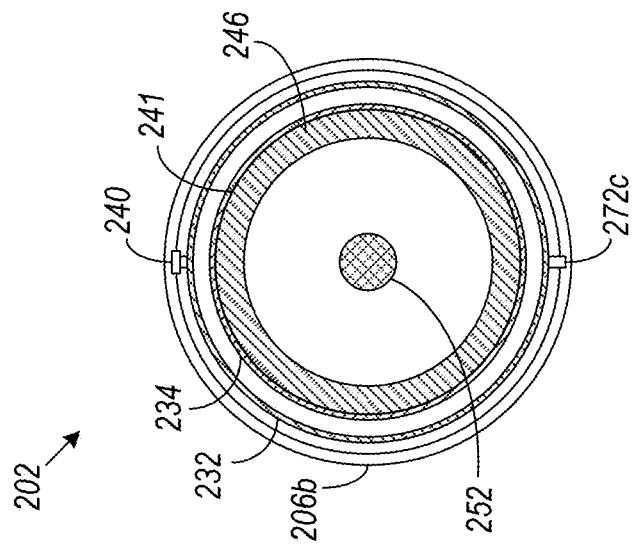
FIGS. 4A and 4B illustrate an exemplary combustion section of the jet vapor system of FIG. 2 according to the disclosed embodiments.
Figure 4B:
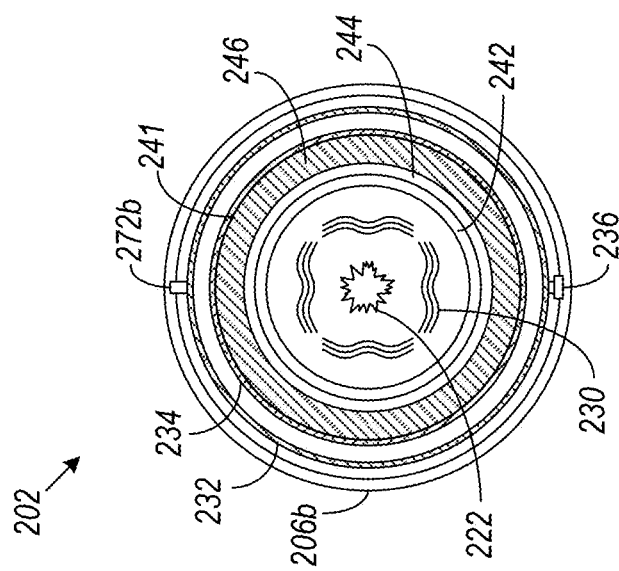

FIGS. 4A-4B are cross-sectional views of the combustion section 202 along line X-X (see FIG. 1). As can be seen here, the jets of water 230 form a sort of water cone or curtain substantially surrounding the flame 222. These jets of water 230 serve as a heat barrier to lower the temperature around the flame 222 and thereby protect the refractory 241 from becoming too hot.

FIG. 5 illustrates a perspective view of the refractory sections 242-246 of the refractory 241. As this figure shows, the refractory sections 242-246 are generally tubular in shape and have substantially the same outer diameter, namely, around 23 to 25 inches (and preferably about 24 inches). However, each refractory section 242-246 may have a larger inner diameter (hence, smaller thickness) at the opening thereof than the preceding refractory section 242-246 (moving in the direction of flow of the combustion gases). The inner diameters are indicated in FIG. 5 by arrows 500, 502, and 504. The step-wise increases in the inner diameters 500-504 cause the pressure to decrease as the combustion gases enter each refractory section 242-246. This sudden shift in pressure creates or increases turbulence in the combustion gases, resulting in the heat becoming more evenly distributed in the combustion gases.

FIGS. 6A-6B show a view of the quench section 204 from the front (FIG. 6A) and from the back (FIG. 6B). In these figures, as well as in previous figures, various components, such as the quench intake 256, water line 258, vapor outlet 260, relief valve 262, drain 264, and water intake 270 have been positioned in certain locations on the quench head 254 for illustrative purposes. However, those having ordinary skill in the art will understand that other locations may also be used without departing from the scope of the disclosed embodiments. For example, instead of being located at the top of the quench head 254, the quench intake 256 (and the water line 258 extending therefrom) may be located on either side or at the bottom of the quench head 254, and so on.

Figure 7:
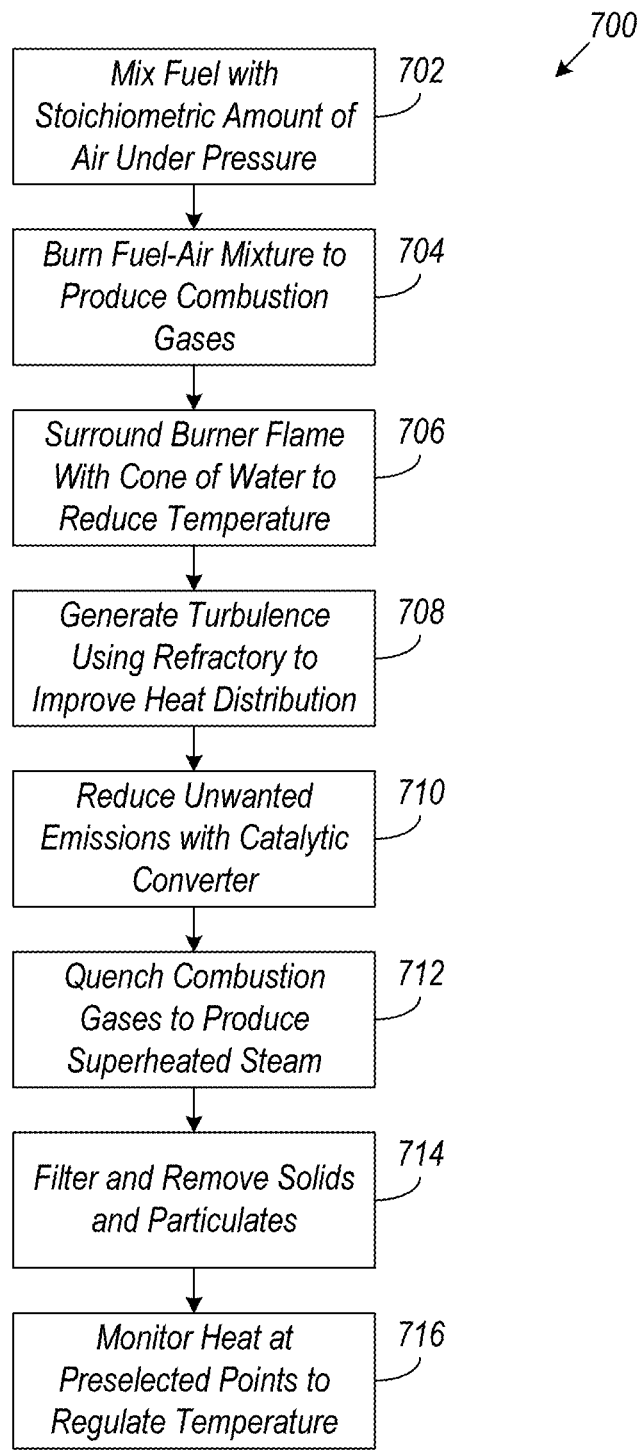
FIG. 7 illustrates an exemplary method that may be used for generating a high-pressure thermal vapor stream using the jet vapor system of FIG. 2 according to the disclosed embodiments.

Turning now to FIG. 7, basic guidelines are shown for the operation of the jet vapor system 100 via a flow chart 700. Note that although the flowchart 700 and other flowcharts herein contains a plurality of functional blocks, one or more of these blocks may be removed from the flowchart 700, and/or one or more other blocks may be added to the flowchart 700, without departing from the scope of the disclosed embodiments. In addition, one or more of the blocks may be combined with one or more other blocks, or divided into multiple smaller blocks, as needed without departing from the disclosed embodiments. Furthermore, although the blocks are displayed sequentially, those having ordinary skill in the art will recognize that one or more blocks may be taken out of sequence and/or simultaneously with one or more other blocks as needed.

The flowchart 700 begins at block 702, where a high-temperature fuel, such as diesel, crude oil, diesel-crude mixture, coal powder, and other short and long chain hydrocarbon products are mixed with a stoichiometric or near stoichiometric amount of air under pressure. The fuel-air mixture is then burned at block 704 to produce combustion gases, primarily nitrogen, carbon dioxide, and water. At block 706, the combustion flame is surrounded with a cone or curtain of water to reduce the temperature on the refractory of the jet vapor system 100. Turbulence may then be generated using the refractory to improve heat distribution at block 708. At block 710, unwanted emissions may be reduced (i.e., converted) using a suitable high-temperature catalytic converter. The combustion gases are thereafter quenched with water at block 712 to produce superheated steam that may then be injected into a subsurface petroleum-bearing formation for heavy oil recovery or used as needed in some other applications. Solids and any other particulates may be periodically removed from the jet vapor system at block 714. Temperature at various points throughout the jet vapor system 100 may be sensed using thermocouples and the like at block 716, and appropriate control measures taken to maintain the temperature at certain predefined levels.

Figure 8A:
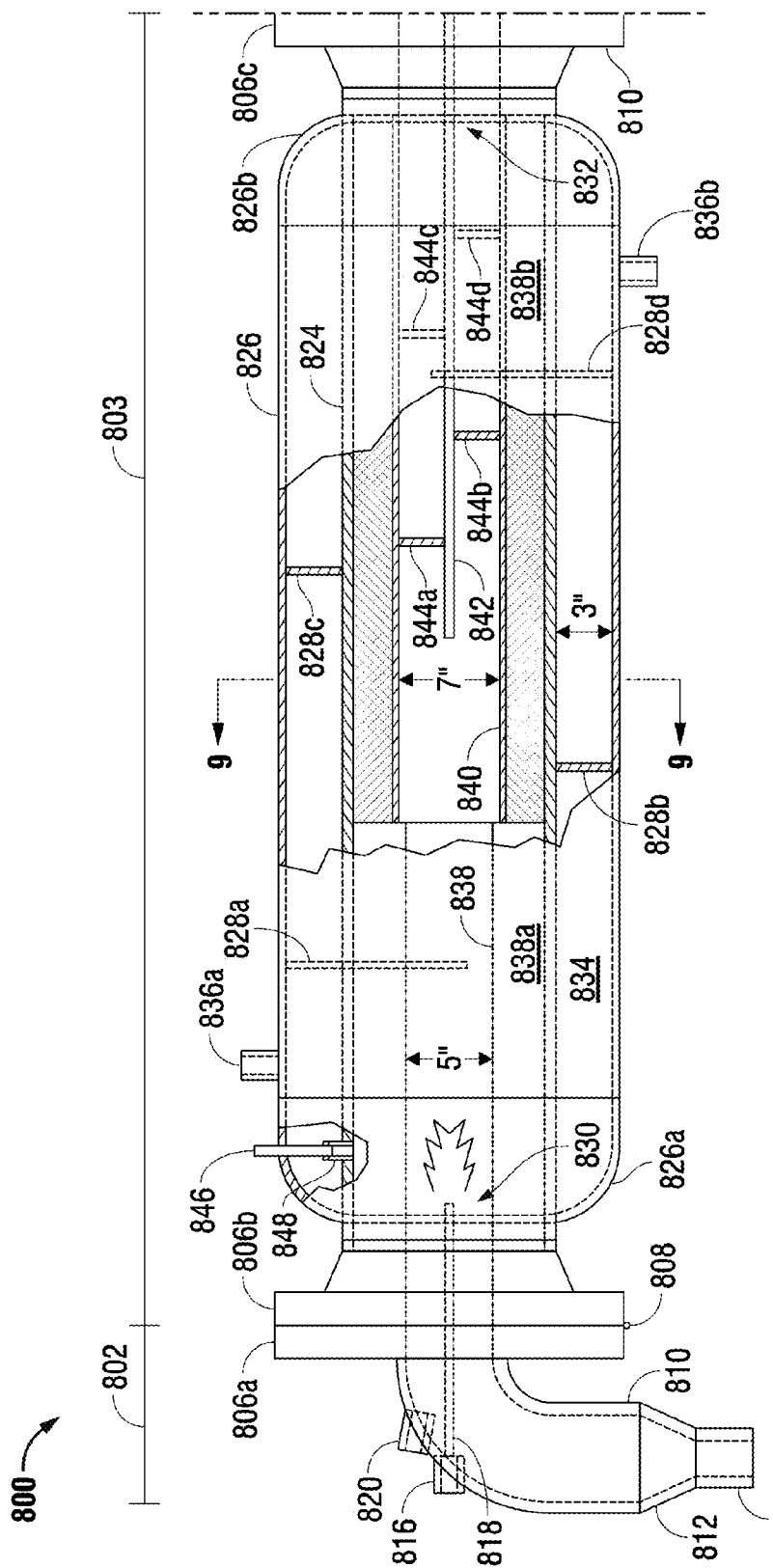
FIGS. 8A and 8B illustrate another exemplary jet vapor system according to the disclosed embodiments.
Figure 8B:
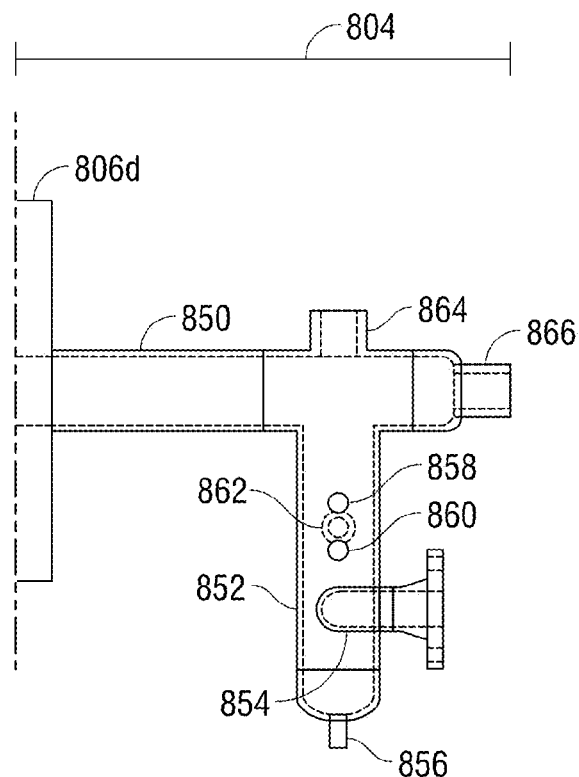

Thus far, several aspects of the jet vapor system have been described with reference to one or more exemplary implementations. FIGS. 8A and 8B illustrate another exemplary implementation of the jet vapor system according to the disclosed embodiments, labeled generally at 800. In this exemplary implementation, a number of components have been added while other components have been reduced, simplified, or omitted altogether in order to optimize the operation of the jet vapor system 800. For example, the intake section and combustion section have been combined into a single unitary section in the jet vapor system 800. In addition, a liner has been added to protect and prevent at least a portion of the refractory from coming into contact with moisture or water used to quench the combustion gases. The result is a portable compact one-pass superheated steam plus nitrogen and carbon dioxide (i.e., all gases, no liquids) generation unit. Other improvements are described further below.

As can be seen in FIGS. 8A and 8B, the jet vapor system 800 is generally tubular in construction and includes an inlet section 802, a combustion section 803, and an outlet section 804. These sections 802, 803 and 804, when coaxially connected as shown in FIG. 8A, form an enclosed vessel, with the combustion section 803 being approximately six to eight feet (and preferably about 6½ feet) in outer length and approximately 15 to 25 inches (and preferably about 20 inches) in outer diameter. Those having ordinary skill in the art will understand, however, that other dimensions besides the particular ones mentioned here may be used for the combustion section 803 without departing from the scope of the disclosed embodiments. In general, the dimensions of the jet vapor system 800 may depend on the size of the air compressor used to pump air into the system. Preferably the air compressor used is one that can pump air into the jet vapor system 800 at a pressure of about 500 psi and a rate of about 900 cubic feet per minute (cfm). As a general guideline, pressures up to about 550 psi may be achieved with a reciprocating compressor (i.e., piston type compressor), which tends to be larger in size, whereas higher pressures may require a rotary compressor, which tends to be more compact.

In some embodiments, the jet vapor system 800 may include flanges or similar mating component mounted for allowing the various sections 802-804 to be connected (i.e., bolted, riveted, etc.) to one another in a manner known to those having ordinary skill in the art. These flanges may include an inlet flange 806a, combustion flanges 806b and 806c, and an outlet flange 806d, attached or otherwise mounted (e.g., welded, brazed, etc.) to the inlet, combustion, and outlet sections 802-804, respectively. The flanges 806a-d may be made of a material that is strong enough to withstand the high-temperatures and pressures inside the jet vapor system 800 as well as provide a watertight and airtight seal. In some embodiments, an example of a flange that may be used as the combustion flanges 806b and 806c is an ANSI Class 300 Schedule 80 bore raised face weld neck flange made of a carbon or stainless steel material and complying with ASME Standard SA-105, or other similar material such as Incoloy® alloys, preferably Incoloy® 800. Similarly, an example of a flange that may be used as the inlet flange 806a or the outlet flange 806d is an ANSI Class 300 raised face blind flange made him of the same or a similar material. A gasket (not expressly shown), such as a spiral wound ANSI Class 300 Style CG gasket, may be disposed between adjacent flanges 806a-d to help achieve a watertight and airtight seal in some embodiments. Hinges 808 may also be provided between adjacent flanges 806a-d in some embodiments to allow the inlet section 802 and the outlet section 804, for example, to swing open for maintenance and repair purposes.

Referring still to FIG. 8A, each of the various sections 802-804 will now be described in more detail. The inlet section 802 allows air, fuel, water, and the like to be taken in to the jet vapor system 800. In some implementations, the inlet section 802 may include an air line 810 extending into and stopping generally at the center of the inlet flange 806 for taking air from an external air supply (not expressly shown) into the jet vapor system 800. The air line 810 may be a straight section of pipe in some embodiments, or it may be a curved section of pipe, such as a six-inch short radius Schedule 80 elbow. In some embodiments, the air line 810 may have a tapered portion 812 that reduces the diameter of the air line 810 to a desired dimension (e.g., three inches). An appropriately sized inlet coupling 814 may then be attached to the air line 810 as needed for coupling the air line 810 to an air nozzle or similar air supply connector. Pressurized air from the external air supply may then be pumped into the jet vapor system 800 through the air line 810 and thereafter used to burn a high-temperature fuel, such as diesel, propane, butane, methane, coal, and the like, including any short or long chain hydrocarbon products, or combinations thereof.

The fuel may be provided by connecting an external fuel supply (not expressly shown) to a fuel coupling 816, and fuel may then be injected via a fuel line 818 extending into the air line 810 about the center of the air line 810. As in previous embodiments, such fuel may be supplied at a rate of about one gallon per minute, for example, and is preferably atomized using standard techniques into a fine mist for improved combustion. The fuel may then be mixed with air entering the air line 810 from the external air supply and burned within the jet vapor system 800. An igniter port 820 may be provided on the air line 810 for igniting the mixture of fuel and air using an appropriate ignition implement.

In a preferred embodiment, the fuel line 818 may have a fuel nozzle (not expressly shown) capable of generating small diameter droplets (e.g., less than 100 micrometers) attached thereto for misting or fogging the fuel into the jet vapor system 800. Such nozzles are typically high-shear, fogging or air-blast atomizing nozzles. The use of a high-shear mister or fogger nozzle has been found to create the smaller diameter droplets of fuel, resulting in more total surface area and allowing the fuel to burn more quickly and evenly. Properly designed combustors will produce minimal excess oxygen remaining after combustion, as this is undesirable because high-temperature unburned oxygen can cause corrosion of metals as well as low temperature oxidation (LTO) of crude oil, which could increase the viscosity of the oil above that produced with steam alone, creating removal efficiency problems during the production phase. Thus, the amount of oxygen provided to the jet vapor system 800 should be controlled to be close to the amount needed for stoichiometric combustion, preferably such that only about one-half of one percent oxygen remains unburned.

In some embodiments, one or more additional substances (e.g., different types of fuels, solvents, cleaners, etc.) may be added to the fuel and air mixture. As one example, coal dust may be added to the fuel and air mixture in some embodiments. As another example, water may also be added to the fuel and air mixture in some embodiments.

Turning now to the combustion section 803, this section of the jet vapor system 800 may include a generally tubular combustion chamber 824, which may be a section of pipe having the combustion flanges 806b and 806c attached at each end. In some embodiments, the section of pipe that forms the combustion chamber 824 may be an ANSI Schedule 80 carbon or stainless steel pipe that complies with ASME Standard SA-106B, preferably an Incoloy® 800 pipe, or the like. The ends of the pipe may be attached to the combustion flanges 806b and 806c, for example, by welding, brazing, and other techniques known to those having ordinary skill in the art. In some embodiments, the combustion chamber 824 may measure approximately 12 inches in outer diameter, ½ to one inch and preferably ⅔ inch in thickness, and may extend the length (or nearly the length) of the combustion section 803. The combustion chamber 824 and the combustion flanges 806b and 806c together may run approximately 70 to 90 inches long in some embodiments, and is preferably about 78 inches long in some embodiments. Of course, other types of materials, dimensions, shapes, and the like may be used for the combustion chamber 824 based on the requirements of a particular application without departing from the scope of the disclosed embodiments.

In some embodiments, the combustion chamber 824 may be enclosed within a combustion housing 826 disposed coaxially with the combustion chamber 824. The combustion housing 826 may have a thickness of about ½ to one inch and preferably about ⅔ inch, and an outer diameter of approximately 15 to 25 inches and preferably about 20 inches. Hemispherical or bowl-shaped end portions, including a proximal end portion 826a and a distal end portion 826b, having approximately the same thickness and outer diameter as the combustion housing 826 may be attached (e.g., welded, brazed, etc.) on either side of the combustion housing 826. Each end portion 826a and 826b may measure approximately five to seven inches and preferably about six inches in length, and may have a circular opening, indicated at 830 and 832, formed coaxially therein of about the same diameter (e.g., approximately 12 inches) as the outer diameter of the combustion chamber 824. The overall length of the combustion housing 826, including the lengths of the end portions 826a and 826b attached thereto, may be the same or slightly less than the length of the combustion chamber 824. For example, if the combustion chamber 824 is about 78 inches in length, the combustion housing 826 may also be about 78 inches in length or it may be only about 74 inches in length. This allows the combustion chamber 824 to extend up to and/or protrude slightly through the openings 830 and 832 in the end portions 826a and 826b when the jet vapor system 800 is assembled.

When the jet vapor system 800 is assembled, an annular gap or space 834 may be defined between the combustion chamber 824 and the combustion housing 826. Spacers 828a, 828b, 828c, and 828d, may be disposed in this space 830 to help maintain the annular space 834 between, and provide reinforcement for, the combustion chamber 824 and the combustion housing 826. In some embodiments, the spacers 828a-d may be semicircular or C-shape plates made of a steel material complying with ASME Standard A-36. Such spacers 828a-d may be evenly distributed in the annular space 834 between the combustion chamber 824 and the combustion housing 826 at predefined intervals along the length of the combustion chamber 824.

In some embodiments, a cooling fluid, such as water, may be used to fill the annular space 834 formed by the combustion housing 826 and the combustion chamber 824 to thereby form a water jacket around the combustion chamber 824. The coolant may be pumped into the annular space 834 from an external coolant supply (not expressly shown) through one or more coolant inlets 836a provided on the combustion housing 826. The water jacket may be used to help keep the temperature within the combustion chamber 824 from exceeding certain predefined thresholds, such as the melting point of the stainless steel or preferably Incoloy 800 section of pipe forming the chamber 824. One or more coolant outlets 836b may then be provided on the combustion housing 826 to allow the coolant in the annular space 834 to exit and, in some cases, recirculate back through the annular space 834.

In some embodiments, as a safety measure, the section of pipe making up the combustion chamber 824 may have a smaller thickness and/or may be made of a weaker material than the combustion housing 826. As a result, the structural integrity of the combustion chamber 824 may be compromised first, causing the combustion chamber 824 to fail before failure of the combustion housing 826 in case there is an unexpected temperature increase. This allows the coolant being retained within the annular space 834 to escape into the interior of the combustion chamber 824 and, among other things, extinguish any flame that may be present before the structural integrity of the combustion housing 826, and hence the jet vapor system 800 itself, is compromised.

In some embodiments, a refractory 838 may be provided within the combustion chamber 824 to help it withstand the high-temperatures that may be present therein. Such a refractory 838 may be a kiln-dried refractory cast as a single unitary cartridge mounted coaxially with the combustion chamber 824, although it is possible to use several discrete and separately removable sections for the refractory 838 (explained further below). In any event, the temperature in the combustion chamber 824 should be kept at no greater than about 3400 degrees Fahrenheit, and preferably less than 3200, to prevent damage to the refractory 838. As with previous embodiments, examples of a suitable refractory 838 may be obtained from Diamond Refractory Services and Huber Construction Company, both of Houston, Tex., as well as other refractory vendors. Materials that may be used for constructing a suitable refractory 838 may be obtained from Able Refractory Products, also of Houston, Tex.

The refractory 838 may be generally tubular in shape and may have an inner diameter of approximately four to six inches, and preferably about five inches, and may extend the entire length, or nearly the entire length, of the combustion chamber 824. The outer diameter of the refractory 838 may be sufficiently small to allow the refractory 838 to fit within the combustion chamber 824 while leaving a narrow annular gap (about 1/16 inch, not expressly shown) between the refractory 838 and the combustion chamber 824 in some embodiments. As an example, if the combustion chamber 824 has an inner diameter of about 12 inches, the outer diameter of the refractory 838 may be about 11 and 15/16 inches. The narrow annular gap allows air to flow in between the section of pipe making up the combustion chamber 824 and the refractory 838, which helps offset the pressure exerted on the other side of the refractory 838 by the combustion gases flowing through the interior of the combustion chamber 824.

As alluded to above, instead of a refractory that has the same inner diameter along its entire length, in some embodiments, the refractory 838 may be composed of multiple discrete sections that effectively partition the combustion chamber 824 into multiple stages, where each refractory section may have a different inner diameter and/or length from the other refractory sections. In the example of FIG. 8A, the refractory 838 may be divided into two sections: a front refractory section 838a adjacent the inlet section 802, and a back refractory section 838b adjacent the outlet section 804, of the jet vapor system 800. These refractory sections 838a and 838b may be designed, for example, to achieve optimal heat insulation for certain portions of the combustion chamber 824. In general, a thicker refractory section may be needed for the portion of the combustion chamber 824 where combustion of fuel occurs, whereas a thinner refractory section may be adequate for the portion of the combustion chamber 824 where quenching of the combustion gases takes place. The different diameters may also help create turbulence in the combustion gases to improve the heat distribution therein. Thus, in some embodiments, the front refractory section 838a may have an inner diameter of approximately four to six inches, and preferably about five inches, while the back refractory section 838b may have a larger inner diameter of approximately six to eight inches, and preferably about seven inches. Similarly, for a combustion chamber 824 having a length of about 78 inches, the front refractory section 838a may be about 30 inches long to protect the portion where fuel combustion occurs, while the back refractory section 838 may be about 48 inches long to protect the portion where quenching takes place. Of course, other diameters and lengths may be used by those having ordinary skill in the art without departing from the scope of the disclosed embodiments.

As in previous embodiments, any suitable refractory material known to those having ordinary skill in the art may be used for the unitary refractory 838, or the individual refractory sections 838a and 838b, including alumina, silica, and magnesia. An example of a suitable refractory material may include any refractory material containing approximately 60 percent alumina, 30 percent silica, and 10 percent inert other materials. In addition, the refractory 838 (or each refractory section 838a and 838b) is preferably precast as a discrete component that may be handled as a single piece. This allows the refractory 838 (or each refractory section 838a and 838b) to be more easily installed in and removed from the combustion chamber 824 as needed, for example, when performing maintenance and repair on the jet vapor system 800.

In some embodiments, because it is generally not advisable to let a hot refractory come into contact with moisture due to possible spalling of the refractory, a protective liner 840 may be provided on the inner surface of the refractory 838, preferably along the portion thereof where moisture may come into contact with the refractory 838. The liner 840 may be a section of pipe, such as ANSI Schedule 80 carbon or stainless steel pipe (e.g., chrome-moly steel pipe) that complies with ASME Standard SA-106B, or preferably an Incoloy 800 pipe, or the like, that can withstand temperatures up to 1500 degrees Fahrenheit, and may have an appropriately sized thickness and diameter based on the diameter of the refractory 838. For example, where the refractory 838 has an inner diameter of five inches, the protective liner 840 may be about ¼ to ½ inches thick and may have an inner diameter of about four and ¾ to about four and ½ inches. The length of the protective liner 840 may vary, but should be sufficiently long to cover the portion of the refractory 838 that may be exposed to contact with moisture (e.g., about 40 to 50 inches). Where the refractory 838 is composed of separate refractory sections 838a and 838b, the liner 840 may have a thickness, diameter, and length that are sufficient to cover the back refractory section 838b (e.g., thickness of about ¼ inches, inner diameter of about six and ¾ inches, and length of about 48 inches).

Water may then be used to quench the combustion gases in the combustion chamber 824. The water may be piped in to the combustion chamber 824 through at least one water line 842 extending into the combustion chamber 824. Such a water line 842 may be made of the same or a similar material as the section of pipe that forms the combustion chamber 824, but other suitable material may also be used without departing from the scope of the disclosed embodiments. In one example, the water line 842 may enter the combustion chamber 824 from a port or coupling (not expressly shown) on the outlet flange 806d, through the adjacent combustion flange 806c, and extending past the opening 832 in the distal end portion 826b. The water line 842 may continue down the center of the combustion chamber 824, along the length thereof, stopping at about the middle of the combustion chamber 824 (well within the coverage area of the protective liner 840). One or more supports 844a, 844b, 844c, and 844d, such as struts, cables, and the like, may be attached to the water line 842 to suspend the water line 842 within the combustion chamber 824. Such supports 844a-d may be anchored to the inner wall of the section of pipe making up the combustion chamber 824 at evenly spaced intervals to hold up the water line 842. Additional water lines 842 may be provided as needed at strategic locations in the combustion chamber 824 without departing from the disclosed embodiments.

The water may then be sprayed, fogged, and the like, through nozzles mounted or otherwise disposed at predefined intervals along the length of the water line 842 onto the hot combustion gases in the combustion chamber 824. Fogging may be preferred over spraying in some cases because it allows more of the surface area of the water to come into contact with the combustion gases. Owing to the direct contact between the combustion gases and the water (i.e., no boiler tubes that could get clogged), the water used need not be mineral-free, as any scales that may form are in the form of particulates that may be easily removed from the bottom of the combustion chamber 824. To this end, fogging is also preferred as fogger nozzles are generally easier to maintain where the water has a high mineral content (i.e., hard water). As explained previously, the introduction of the water onto the hot combustion gases turns the water into superheated steam or vapor having a temperature above 212 degrees Fahrenheit. In some embodiments, the superheated steam or vapor may have a temperature of about 600 to 750 degrees Fahrenheit. Additional water lines 842 may be strategically located as needed, for example, to fog water onto the stream of thermal vapor as it is exiting the combustion chamber 824 in applications where it is desirable to provide a thermal vapor stream having 100 percent, or nearly 100 percent, humidity.

In some embodiments, the water line 842 may be connected to or otherwise in fluid communication with the annular space 834 between the combustion chamber 824 and the combustion housing 826 such that the coolant in the annular space 834 may also be used to quench the hot combustion gases. In some embodiments, certain chemicals well known to those having ordinary skill in the art may be added to the water line 842 to convert any unwanted gases that may be present in the combustion gases into a soluble substance that may subsequently be removed. In some embodiments, a mesh-type high-temperature catalytic converter (not expressly shown) may be removably disposed over the opening 832 in the distal end portion 826b to convert or reduce any unwanted emissions (e.g., turn carbon monoxide to carbon dioxide, etc.) that may result from incomplete combustion of the fuel and air before the combustion gases enter the outlet section 804.

Referring now to FIG. 8B, the outlet section 804, like the inlet section 802, may include the outlet flange 806d mentioned earlier that is similar in material and dimensions to the inlet flange 806a. In some embodiments, the outlet section 804 may include an outlet channel 850 extending from the outlet flange 806d that allows the combustion gases and superheated steam to leave the combustion chamber 824. The outlet channel 850, which may be about four inches in diameter and about 11 inches length, may be coupled via a T-joint to an outlet path 852. The outlet channel 850, T-joint, and outlet path 852 may be made of ANSI Schedule 80 carbon or stainless steel, preferably Incoloy 800, or other suitable materials. The outlet path 852 leads to an outlet 854 mounted roughly at the middle portion of the outlet path 852 through which combustion gases and superheated steam may exit the jet vapor system 800. A drain 856 located at the terminal end of the outlet path 852 allows the outlet path 852 to be drained as needed.

In some embodiments, one or more monitoring ports, such as the ones at 858 and 860, may be located on the outlet path 852 for monitoring pressure, temperature, and other information pertaining to the combustion gases and superheated steam exiting the jet vapor system 800. In other embodiments, an injection coupling 862 may also be located on the outlet path 852 for allowing various chemicals, solutions, and other substances to be injected and mixed with the combustion gases and superheated steam as it is exiting the jet vapor system 800. In yet other embodiments, a relief valve 864 may be provided, for example, on the T-joint connecting the outlet channel 850 and outlet path 852 as a safety precaution to relieve any excess pressure, and also as a way to help control the amount of thermal vapor being injected for a particular application. In still other embodiments, a water coupling 866 may be provided, for example, to allow water to be injected and mixed with the combustion gases and superheated steam as needed.

In some embodiments, a plurality of thermocouples or other temperature sensing devices may be provided at various locations on the jet vapor system 800 for monitoring and regulating the temperature throughout the jet vapor system 800 as needed. The output of these thermocouples may be fed to various temperature-based monitoring devices for monitoring and regulating the temperature throughout the jet vapor system 800 as needed. The monitoring and regulating may be performed manually by an operator, or they may be performed automatically with a computer-based control system, or a combination of both. In one implementation, the output of one or more thermocouples may be connected to a fuel pump control unit that is configured to control the fuel to the inlet section 802 based on the temperature being monitored. In another implementation, the output of one or more thermocouples may be connected to a water pump control unit (not expressly shown) that is configured to control the amount of water pumped into the combustion chamber 824 based on the temperature being monitored.

Additional views of the jet vapor system 800 are shown in FIGS. 9-13 according to aspects of the invention.

Figure 9:
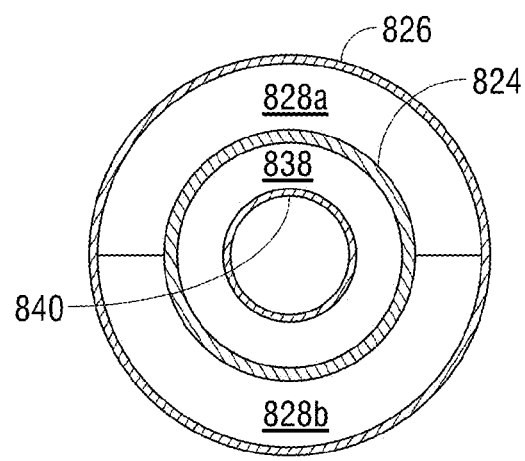
FIG. 9 illustrates an exemplary combustion section for the jet vapor system of FIGS. 8A and 8B according to the disclosed embodiments.

Referring first to FIG. 9, a cross-sectional view of the jet vapor system 800 can be seen showing the combustion chamber 824, the combustion housing 826, two of the spacers 828a and 828b, and the protective liner 840.

Figure 10:
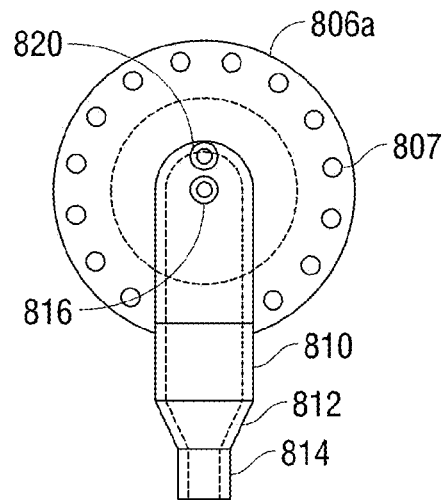
FIG. 10 illustrates an exemplary inlet section for the jet vapor system of FIGS. 8A and 8B according to the disclosed embodiments.

FIG. 10 shows a front view of the inlet section 802 for the jet vapor system 800, including the inlet flange 806a having a plurality of holes 807 formed therein for attachment to the adjacent one of the combustion flanges (806b, not shown here). The air line 810, tapered section 812 thereof, and inlet coupling 814 may also be seen, as well as the fuel intake 816 and igniter port 820.

Figure 11:
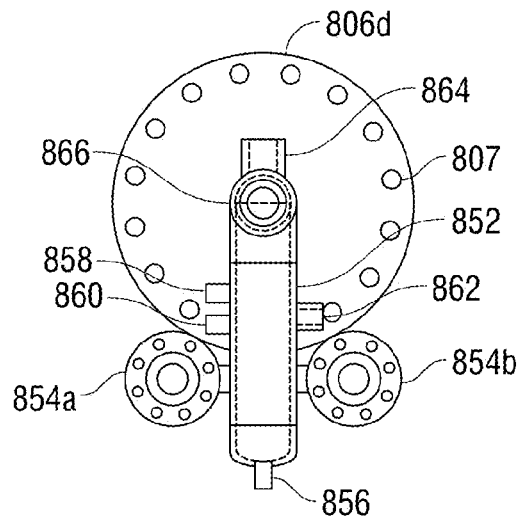
FIG. 11 illustrates an exemplary outlet section for the jet vapor system of FIGS. 8A and 8B according to the disclosed embodiments.

FIG. 11 shows a back view of the outlet section 804 for the jet vapor system 800, including the outlet flange 806d having a plurality of holes 807 formed therein for attachment to the adjacent one of the combustion flanges (806c, not shown here). Also shown are the outlet path 852, the outlet 854, including dual outlet couplings 854a and 854b, the monitoring ports 858 and 860, the injection coupling 862, the relief valve 864, and the water coupling 866.

Figure 12:
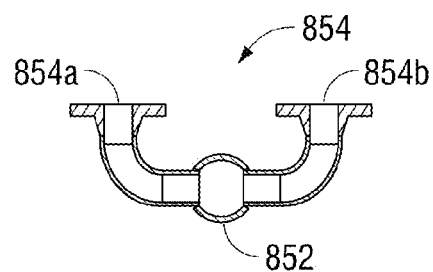
FIG. 12 illustrates an exemplary outlet for the outlet section of FIG. 11 according to the disclosed embodiments.

FIG. 12 is a cross-sectional view of the outlet 854 showing the dual outlet couplings 854a and 854b as they are mounted to the outlet channel 852 according to aspects of the invention. In some embodiments, the dual outlet couplings 854a and 854b may each be 2-inch ANSI Schedule 80 stainless steel or preferably Incoloy 800 elbows having weld neck flanges attached thereto.

Figure 13A:
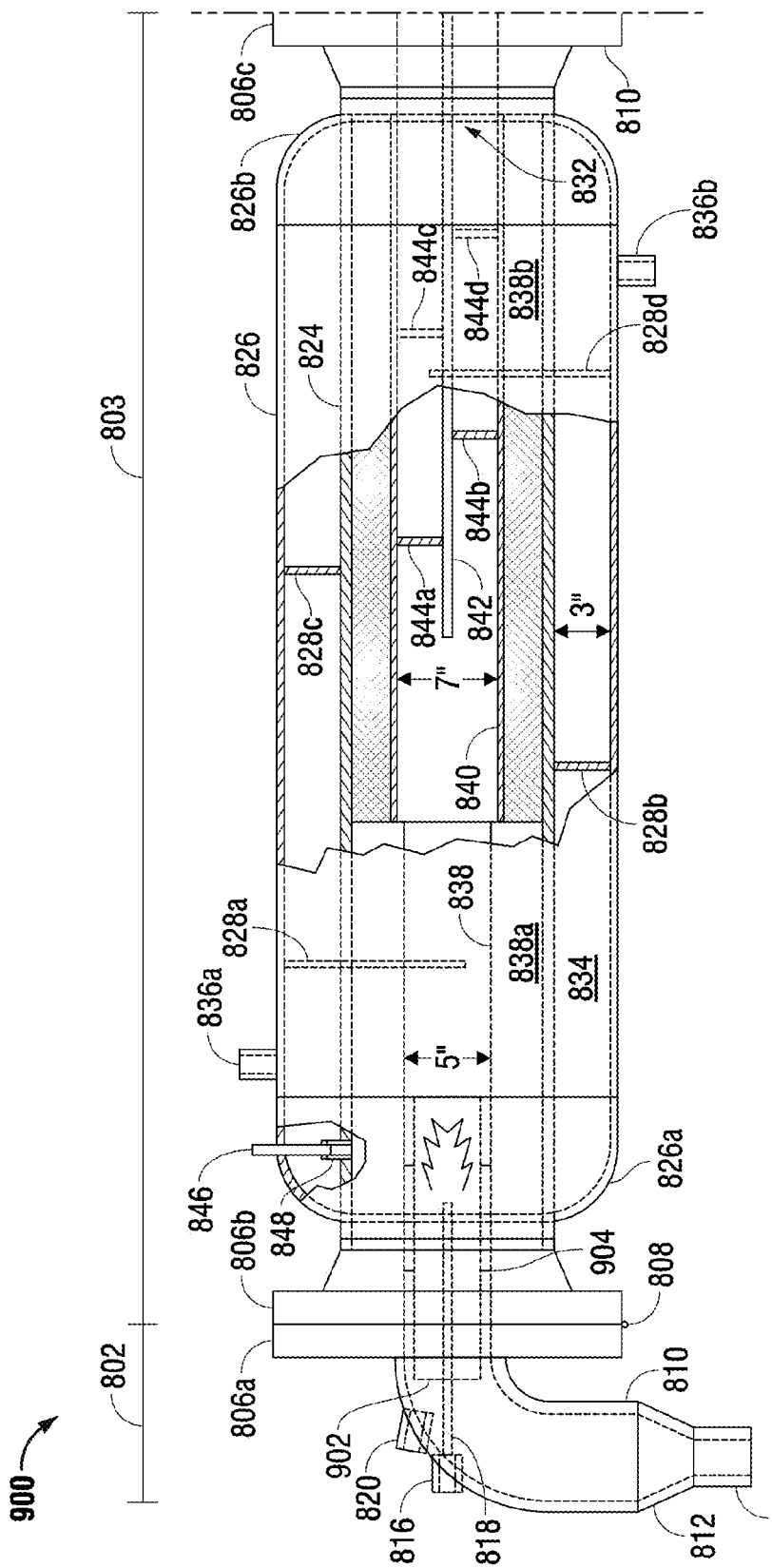
FIGS. 13A and 13B illustrate another exemplary jet vapor system according to the disclosed embodiments.
Figure 13B:
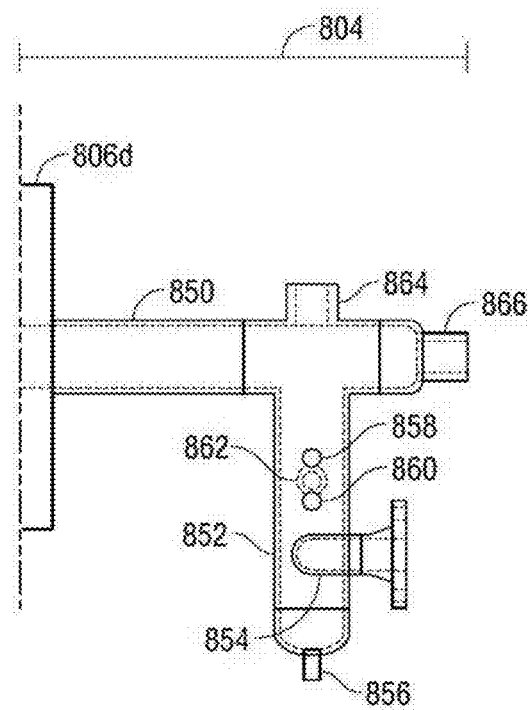

FIGS. 13A and 13B illustrate another jet vapor system 900 according to aspects of the invention. The jet vapor system 900 is a similar to the jet vapor system 800 shown in FIGS. 8A and 8B, except water is also introduced in the combustion chamber 824 near the area where combustions takes place (shown more clearly in FIG. 14) to help maintain the temperature in that area below a predefined threshold (e.g., about 750 degrees Fahrenheit). Because introducing water in that area may inadvertently extinguish the flame, in some embodiments, a quarter-inch steel tubing 902 may be mounted within the combustion chamber 824 to protect the carbon or stainless steel or preferably Incoloy 800 pipe that forms the combustion chamber 824 from the high combustion temperatures within the chamber. In some embodiments, the steel tubing 902 may extend from a point about three inches beyond the area where fuel combustion is expected to occur to just inside the air line 810 near the exit thereof. Appropriate support structures, only one of which is specifically labeled here at 904, may be used to hold the steel tubing 902 within the combustion chamber 824.

Figure 14:
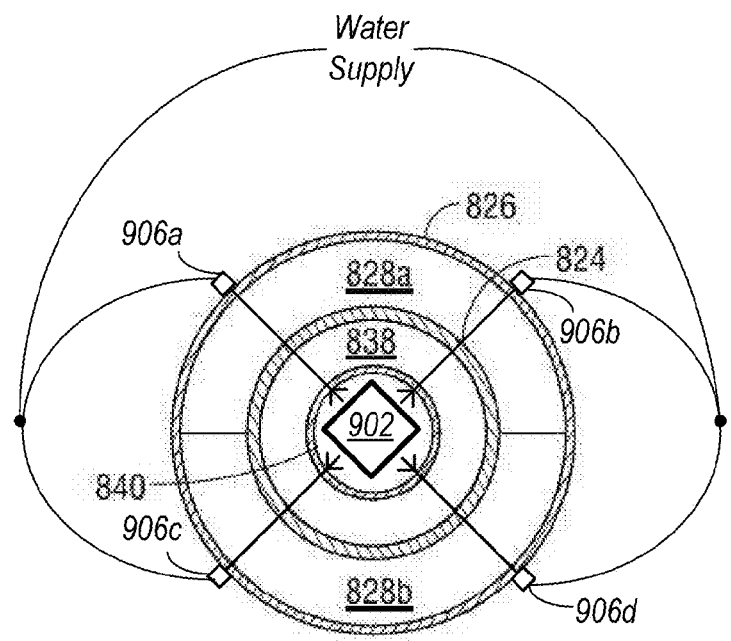
FIG. 14 illustrates an exemplary combustion section for the jet vapor system of FIG. 13 according to the disclosed embodiments.

FIG. 14 shows a cross-sectional view of the jet vapor system 900. As can be seen, the jet vapor system 900 is otherwise similar to jet vapor system 800 shown in FIGS. 8A and 8B, except for the additional steel or preferably Incoloy 800 tubing 902 and the water being introduced onto the tubing. In some embodiments, water may be sprayed onto the tubing 902 from appropriately placed nozzles (not expressly numbered). As mentioned above, this helps lower the temperature of the tubing 902 and/or keep the temperature in the area around the tubing 902 from exceeding a predefined threshold (e.g., about 750 degrees Fahrenheit). The water may be fed to the nozzles from a plurality of water couplings 906a, 906b, 906c, and 906d installed on the jet vapor system 900. One or more of the water couplings 906a-d may be connected together, and all of them connected to an external water supply. In some embodiments, about 33 percent of the water injected into the jet vapor system 900 during operation may be injected through the water couplings 906a-d, while the remaining 67 percent is provided through the water line 842.

Operation of the jet vapor systems 800 and 900 will now be described. In general, fuel is injected into the jet vapor system via the inlet section 802 in a manner known to those having ordinary skill in the art at about 500 psi above the pressure in the combustion chamber 824 from an external fuel supply through the fuel intake 816. At the same time, a stoichiometric or greater amount of air is pumped into the jet vapor system at about 350-800 psi and about 180 degrees Fahrenheit from an external air compressor through the air intake 814. The air and fuel are mixed together, ignited, and burned in the combustion section 803 to produce a hot mixture of combustion gases that is composed primarily of nitrogen, carbon dioxide, and water (in the form of superheated steam).

The type of fuel used, in some embodiments, is crude oil or a mixture of crude oil and diesel, although diesel by itself may also be used as well as kerogen, coal powder, and other short and long chain hydrocarbon products. Based on the fuel selection (e.g., carbon-hydrogen ratio) the user of the jet vapor system can control the amount of $CO_2$ present in the effluent stream. A fuel-flexible burner, such as the one proposed herein could use various fuels or fuel blends to ensure that a desired $CO_2$ percentage is delivered to the formation to maximize heavy oil extraction. A small amount of water may be added to the fuel in some embodiments, for example, around two to eight percent and preferably about five percent water, to reduce the combustion temperature. Preferably, a sulfur-free diesel is used as the fuel such that no sulfuric acids are produced and the combustion gases remain slightly basic (i.e., about 7 pH), but where sulfur is present in the fuel used, small amounts of nitrogen oxides and are sulfur oxides may also be present in the combustion gases. Also, where the fuel used is a diesel or similar fuel, external ignition is not needed once the temperature and/or pressure within the combustion chamber 824 reaches the fuel's auto-ignition temperature and/or pressure (e.g., about 410 degrees Fahrenheit and/or 350 psi for diesel). Preferably the diesel fuel is preheated to 80 to 130 degrees Fahrenheit. And as before, although a stoichiometric combustion is desired, those having ordinary skill in the art will understand that the combustion may be only "substantially" stoichiometric in practice. Thus, the combustion taking place in the combustion chamber 824 is designed to run toward the excess oxygen side, meaning that there may be a small amount of excess oxygen (e.g., less than one-half of one percent) remaining in some cases. However, as mentioned earlier, unburned high-temperature oxygen can cause corrosion of metals as well as low temperature oxidation of crude oil, and therefore leaving too much oxygen unburned should be avoided to the extent possible.

As the combustion gases pass through the combustion chamber 824, a sufficient amount of water is introduced, for example, by fogging, spraying, and the like onto the combustion gases from the water line 842 to produce superheated steam or water gas. Different types of nozzles known to those having ordinary skill in the art may be attached to the end of the water line 842 to control the way the water is introduced onto the combustion gases (e.g., fogging, spraying, etc.). The water reduces the temperature in the combustion chamber 824 from about 3400 degrees Fahrenheit where combustion of the fuel takes place to about 2000 degrees Fahrenheit where quenching the combustion gases takes place. The chrome-molybdenum (or "chrome-moly") steel or preferably Incoloy 800 protective liner 840, which typically has a working temperature of about 1500 degrees Fahrenheit, protects the refractory 838 (or back refractory section 838*b*) from contact with the water. Indeed, because of the presence of the water jacket formed by the combustion housing 826 and the combustion chamber 824, little or no pressure is exerted on the liner 840, which allows the liner 840 to actually withstand temperatures a little higher than it otherwise could if it were under pressure. The combustion gases are gradually cooled to about 550 to 700 degrees Fahrenheit, or about 100 to 200 degrees above the superheat temperature. This arrangement allows the jet vapor system to operate in the superheat region, an approach that is entirely different from any other existing system in the art.

In some embodiments, corrosion-controlling chemicals well known to those having ordinary skill in the art may be added to the water from the water line 842 to convert any nitrogen oxides and/or sulfur oxides in the combustion gases to soluble salts that may then be removed periodically via a drain (not expressly shown). The generated stream of thermal vapor (superheated steam, nitrogen, and carbon dioxide) may then be injected into a subsurface petroleum-bearing formation for enhance recovery of petroleum, used for cogeneration of electricity and heat, or as an energy source in other suitable applications. It has been observed, for example, that the jet vapor system described herein produces over 10,000 barrels per day of thermal vapor at 550 psi (running in 24 hour cycles). It has also been observed that the presence of the non-condensable carbon dioxide and nitrogen in the combustion gases results in observed superheat temperature that is lower than the expected superheat temperature by about 100 degrees Fahrenheit at 350 psi. Therefore, the superheated steam, nitrogen, and carbon dioxide leave or exit the jet vapor system at a temperature that is about 200 to 300 degrees in excess of the observed superheat temperature.

In some embodiments, a back pressure control valve (not expressly shown) may be disposed downstream of the jet vapor system to help stabilize and maintain consistent pressure within the jet vapor system. Such a back pressure control valve may be needed in certain applications, such as enhanced oil recovery operations, where pressure within the subterranean formation may fluctuate as oil, gas, and water is pumped from the formation. The pressure fluctuations may affect the rate of combustion within the jet vapor system, for example, by causing the flame therein to pulsate. The back pressure control valve helps substantially prevent any such pressure changes from being feedback into the jet vapor system.

Embodiments of the jet vapor system discussed thus far have generally required the use of a refractory in order to protect the internal walls of the combustion chamber from the high heat generated by the combustion gases. In some embodiments, however, it may be desirable to forgo the refractory, for example, in order to reduce cost, complexity, and component count, and to minimize maintenance. Instead of a refractory, alternative cooling techniques, among other things, may be used to maintain the temperature on the inside walls of the combustion chamber within certain acceptable limits.

Figure 15:
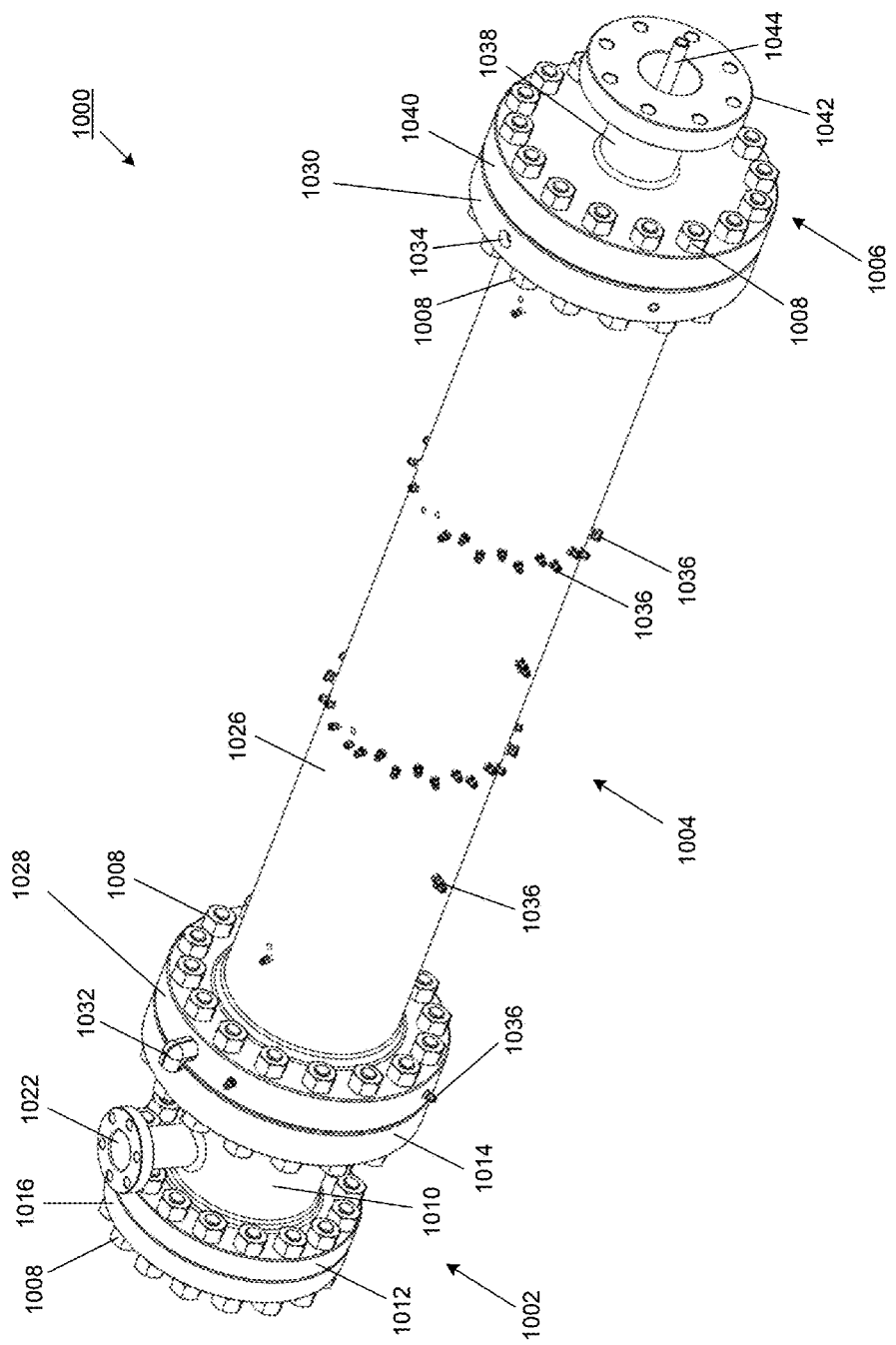
FIG. 15 illustrates yet another exemplary jet vapor system according to the disclosed embodiments.

FIG. 15 is a perspective view of an exemplary jet vapor system 1000 that uses alternative cooling techniques instead of a refractory to maintain the temperature on the inside walls of the combustion chamber within preset limits. As can be seen, the jet vapor system 1000 is similar in appearance to earlier embodiments insofar as there is an inlet section 1002, a combustor section 1004, and an outlet section 1006 that, when coaxially connected to one another as shown, generally resembles an elongated tubular reactor.

Specifically, the inlet section 1002 may be connected to the combustor section 1004 and the combustor section 1004 may be connected to the outlet section 1006. The connections may be accomplished using any technique capable of providing and maintaining a reasonably reliable airtight and watertight seal between the sections, notwithstanding the high temperatures and pressures contemplated herein. Examples of mechanisms that may be used to implement the connections include nuts and bolts, indicated generally here at 1008, as well as rivets, clamps, welds, braze, and the like. In a preferred embodiment, the connection is temporary, as may be the case with nuts and bolts, rather than permanent to allow disassembly of the inlet section 1002, combustor section 1004, and outlet section 1006 from one another for purposes of inspecting and maintaining the interior of the various sections.

Referring first to the inlet section 1002, this section functions mainly to receive fuel and air into the jet vapor system 1000. In some embodiments, the inlet section 1002 is composed primarily of a tubular inlet body or spool 1010 coaxially connected to or integrally formed with an inlet upstream flange 1012 at one end and an inlet downstream flange 1014 at the other end. An inlet cap 1016 may be attached to the inlet upstream flange 1012 to seal the inlet section 1002 from the external environment. Although not visible in this view, the inlet cap 1016 may have a fuel intake 1018 or opening formed therein or otherwise provided for allowing an external fuel line 1020 to be connected to the inlet section 1002. Similarly, an air intake 1022 or opening may be formed or otherwise provided on the inlet spool 1010 to allow an external air line 1024 to be connected to the inlet section 1002. It is also possible to place the air intake 1022 on the inlet cap 1016 in some embodiments in order to provide a more linear air flow in the inlet section 1002.

The combustor section 1004, like the inlet section 1002, is composed primarily of a tubular combustor body 1026 coaxially connected to or integrally formed with a combustor upstream flange 1028 at one end and an combustor downstream flange 1030 at the other end. As in earlier embodiments, the combustor body 1026 confines and contains the combustion of fuel and air therein, producing combustion gases (primarily nitrogen, carbon dioxide, and water) that heat water into superheated steam or thermal vapor. In some embodiments, a coolant intake 1032 or opening may be formed or otherwise provided in the combustor upstream flange 1028 to allow a coolant, such as water, to be injected into the combustor section 1004. Similarly, a coolant outlet 1034 may be formed or otherwise provided in the combustor downstream flange 1030 to allow a coolant, such as water, to exit the combustor section 1004. Sensor fittings 1038 may be formed or otherwise provided on the surface of the combustor upstream flange 1028 for receiving one or more temperature probes. Similar sensor fittings 1034 may also be strategically located along the outer surface of the combustor body 1026 and/or the combustor downstream flange 1030. The sensor fittings 1034 allow various sensors to be connected to the jet vapor system 1000 to monitor, for example, the temperature on the inner and/or outer walls of the combustor body 1026 and/or the temperature and pressure of the coolant being used to cool the combustor body.

The outlet section 1006 functions mainly to channel the superheated steam or thermal vapor from the combustor section 1004 to an external application. In some embodiments, the outlet section 1006 is composed primarily of a tubular outlet body or spool 1038 coaxially connected to or integrally formed with an outlet upstream flange 1040 at one end and an outlet downstream flange 1042 at the other end. The outlet downstream flange 1042 may then be connected to well tubing or well casing, or other applications, to allow the superheated steam or thermal vapor in the combustor section 1004 to be injected, for example, into a subterranean formation or other reservoir. An opening in the outlet downstream flange 1042 allows a water line or lance 1044 to be passed through the outlet section 1006 into the combustor section 1004 for bringing water into the combustor section 1004. The water is then heated into superheated steam or thermal vapor by the combustion gases in the combustor section 1004.

Figure 16:
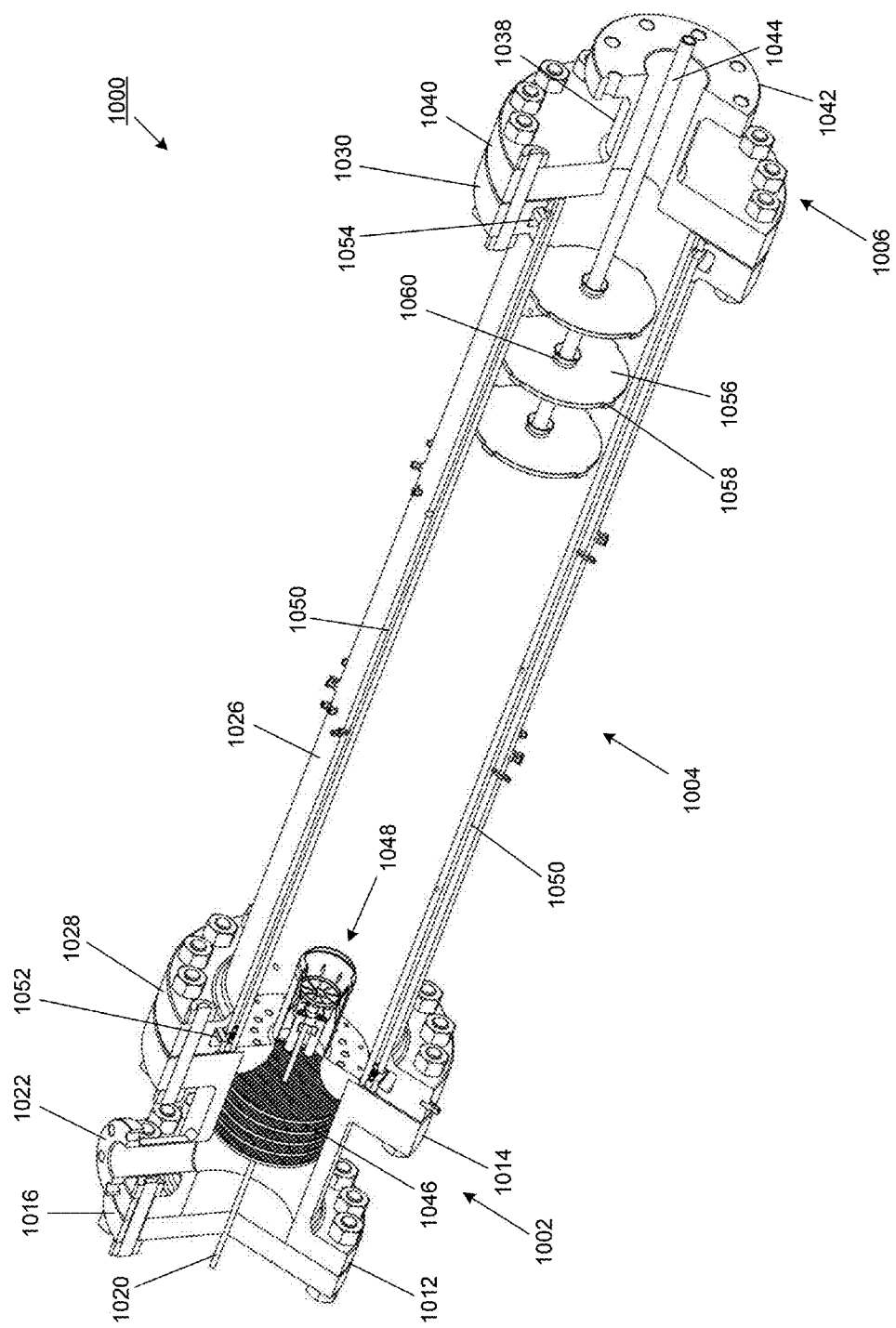
FIG. 16 illustrates a cutaway view of the exemplary jet vapor system of FIG. 15 according to the disclosed embodiments.

A cutaway view of the jet vapor system 1000 is shown in FIG. 16. As seen here, one or more flow straighteners 1046, each resembling a circular perforated plate having a center opening and about the same diameter as the inlet section 1002, may be mounted coaxially in the inlet section 1002. The flow straighteners 1046 help force the air from the air intake 1022 to flow through the inlet section 1002 in a more linear and smoother fashion to the improve combustion. In the present embodiment, there are five such flow straighteners 1046 in parallel and spaced apart from one another by a predefined distance, but a different number of flow straighteners 1046 may certainly be used without departing from the scope of the disclosed embodiments. Alternatively, the flow straighteners 1046 may be omitted altogether, for example, in embodiments where the air intake 1022 is more in line with the inlet section 1002. The fuel line 1020 may then be inserted through the center openings of the flow straighteners 1046 and up to a burner assembly 1048 disposed just inside the opening of the combustor section 1004 adjacent the combustor upstream flange 1028.

As discussed previously, the combustion in the combustor section 1004 can bring the temperature near the inner wall of the combustor body 1026 to an overly elevated level, as high as 3400 degrees Fahrenheit in some cases. To maintain the inner wall of the combustor body 1026 at less than the maximum temperature that may be safely tolerated, about 600 to 700 degrees Fahrenheit depending on the particular application, a plurality of internal cooling channels 1050 may be formed or otherwise provided along the length of the combustor body 1026. These internal cooling channels 1050 may be gun drilled or otherwise bored in the combustor body 1026 evenly spaced apart from and parallel with one another. Water or other suitable coolant may then be pumped through the internal cooling channels 1050 to carry heat away from the combustor body 1026. In some embodiments, there may be up to 44 internal cooling channels 1050, but a different number of internal cooling channels 1050 may certainly be used without departing from the scope of the disclosed embodiments.

An upstream coolant manifold 1052 may be formed or otherwise provided internally within the upstream combustor flange and in fluid communication with the internal cooling channels 1050 of the combustor body 1026. The upstream coolant manifold 1052 acts as a sort of reservoir to receive water or other coolant from the coolant intake 1032 and then distribute the water or other coolant to the internal cooling channels 1050. At the other end of the combustor section 1004, a similar downstream coolant manifold 1054 may be formed or otherwise provided internally within the downstream combustor flange and in fluid communication with the internal cooling channels 1050 of the combustor body 1026. The water or other coolant in the internal cooling channels 1050 may then flow out to the downstream coolant manifold 1054 and thereafter exit the combustor section 1004 through the coolant outlet 1034 in the combustor downstream flange 1030.

At the end of the combustor section 1004 opposite the burner assembly 1048, one or more after cooler plates 1056 may be mounted coaxially and in parallel with one another, spaced apart by a predefined distance. The after cooler plates 1056 each resemble a circular plate with a center opening and tabs 1058 protruding at evenly spaced intervals from the perimeter or outer edge of the after cooler plate 1056. The tabs 1058 result in gaps being formed between the inner wall of the combustor body 1026 and the outer edge of each after cooler plate 1056. These gaps act as a type of baffle system through which combustion gases and superheated steam in the combustor section 1004 may flow, helping to enhance the mixing of the combustion gases and superheated steam. Although three after cooler plates 1056 are shown in this embodiment, fewer or more after cooler plates 1056 may certainly be used, or they may be omitted entirely, without departing from the scope of the disclosed embodiments.

The water line or lance 1044 may then be inserted through the center openings of the after cooler plates 1056 so that it extends into the combustor section 1004 about a third to a half of the length of the combustor section 1004. In some embodiments, funnel-shaped guides 1060 may be installed in the center openings of the after cooler plates 1056 to facilitate the insertion of the water line or lance 1044 through the center openings of the after cooler plates 1056. Water may then be injected in to the combustor section 1004 through the water line or lance 1044 and sprayed, fogged, or otherwise introduced onto the combustion gases.

In preferred embodiments, the water introduced into the combustor section 1004 through the water line or lance 1044 is the same water that was used as the coolant in the internal cooling channels 1050. In these embodiments, although not expressly shown, the water line or lance 1044 may be connected to or otherwise in fluid communication with the coolant outlet 1034 in the combustor downstream flange 1030. Water from the internal cooling channels 1050 exiting the downstream coolant manifold 1054 may then flow into the water line or lance 1044 and sprayed or fogged onto the combustion gases. This type of cooling technique is commonly referred to as "regenerative" cooling by those having ordinary skill in the art because, among other reasons, all or substantially all (e.g., about 25 percent) of the heat carried away from the combustor body 1026 by the water in the internal cooling channels 1050 is applied toward generating the superheated steam or thermal vapor. In other words, much or all of the heat is put back into the system such that there is little or no heat lost to the external environment, thus requiring less fuel to generate the superheated steam.

Figure 17:
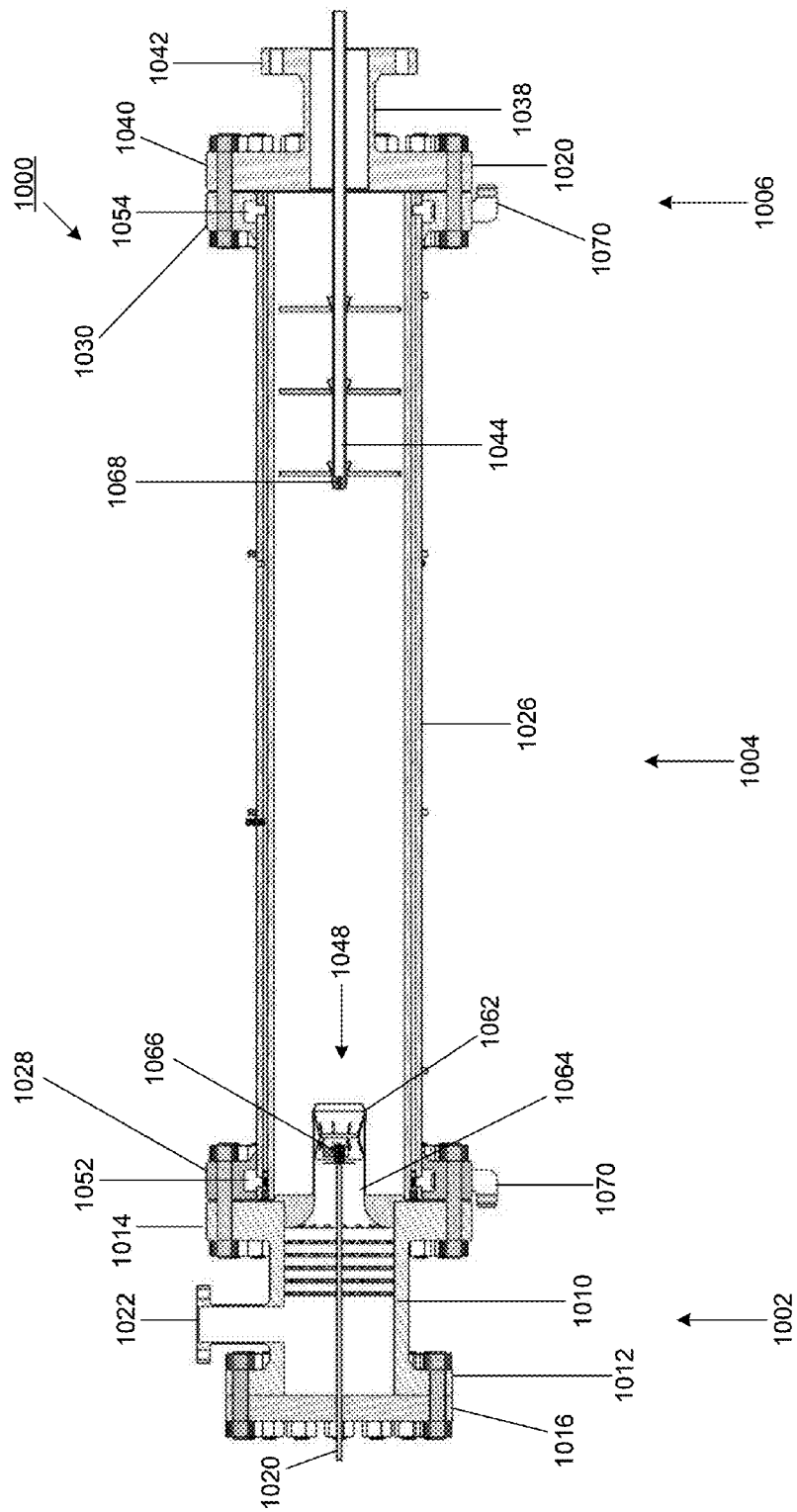
FIG. 17 illustrates a cross-sectional view of the exemplary jet vapor system of FIG. 15 according to the disclosed embodiments.

FIG. 17 shows a cross-sectional view of the jet vapor system 1000 discussed with respect to FIGS. 15 and 16. As can be seen in this view, the burner assembly 1048 may include a burner 1060 and a mounting mechanism 1062 configured to hold the burner 1062 within the opening of the combustor section 1004. The burner 1062 facilitates efficient combustion of the fuel and air being injected into the combustor section 1004 via the inlet section 1002. To this end, any conventional burner 1062 known to those having ordinary skill in the art may be used, including swirl-based burners, non-swirl burners (e.g., v-gutter, bluff body, trapped vortex, etc.), flame retention burners, and the like. Likewise, any number of mounting mechanisms 1064 may be used to secure the burner 1062 in place within the combustor section 1004 and no specific type of mounting mechanism is required. An igniter (not expressly shown) may then be provided in some embodiments near the fuel nozzle 1066 of the fuel line 1022 initiate combustion of the fuel. The igniter may be any suitable igniter known to those having ordinary skill in the art and may include a glow-plug igniter, electrical igniter, and the like.

Water may then be introduced onto the combustion gases via a water nozzle 1068 at the end of the water line or lance 1044. Any suitable fuel nozzle 1066 and water nozzle 1068 known to those having ordinary skill in the art may be used, including any of the commercially available spray or atomizing nozzles discussed earlier herein, without departing from the scope of the disclosed embodiments.

Also shown in this view are connectors 1070 that may be fitted to the coolant intake 1032 on the combustor upstream flange 1028 and the coolant outlet 1034 on the combustor downstream flange 1030. The connectors 1070 allow external water or coolant lines to be hooked up to the jet vapor system 1000 to be used in the manner discussed herein. Any standard connector 1070 may be employed without departing from the scope of the disclosed embodiments.

Figure 18:
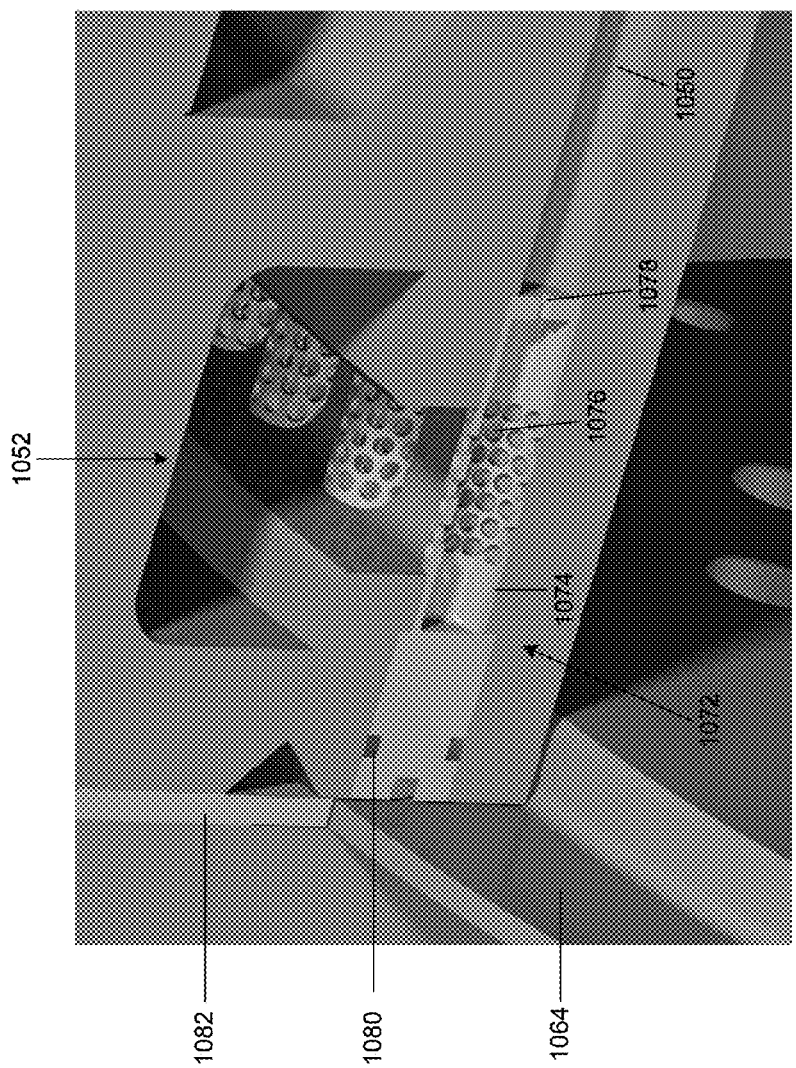
FIG. 18 illustrates a close up view of a coolant manifold for the exemplary jet vapor system of FIG. 15 according to the disclosed embodiments.

A close-up view showing additional details of the upstream coolant manifold 1052 and internal cooling channels 1050 is illustrated in FIG. 18. A portion of the burner mounting mechanism 1064 of the burner assembly 1048 may also be seen in this view, including an internal ledge thereof. As discussed above, the upstream coolant manifold 1052 is generally in fluid communication with the internal cooling channels 1050. In some embodiments, the upstream coolant manifold 1052 is similar to the downstream coolant manifold 1054 in that it may be in direct fluid communication with the internal cooling channels 1050. In other embodiments, however, an orifice insert 1072 may be installed between the upstream coolant manifold 1052 and each internal cooling channel 1050 to transition the water or coolant into the internal cooling channel 1050. These orifice inserts 1072 function to create a pressure drop in the flow of water or coolant between the upstream end and the downstream end of the internal cooling channels 1050.

In some embodiments, each orifice insert 1072 may resemble a cylinder or tube 1074 roughly the same outer diameter as the diameter of the internal cooling channels 1050 and having perforations or holes 1076 formed along the tube 1074. Each orifice insert 1072 may also have a reduced diameter central opening 1078 at the downstream end thereof that acts to increase the velocity of the water or coolant passing through the orifice insert 1072. The perforations or holes 1076 allow the water or coolant from the upstream coolant manifold 1052 to enter the internal cooling channel 1050, thereafter exiting with a higher pressure through the reduced diameter central opening 1078 into the internal cooling channel 1050. Such an arrangement has been beneficially observed to minimize or prevent local boiling of the water or coolant in the internal cooling channels 1050, thereby eliminating or minimizing scale buildup within the internal cooling channels 1050. An O-ring or similar gasket 1080 may be provided in some embodiments to help form a watertight seal for the orifice insert 1072. Likewise, a metal gasket 1082 may be provided between the combustor upstream flange 1028 and the inlet downstream flange 1014 for sealing purposes.

Any suitable material may be used for the various components of the jet vapor system 1000 as described above provided the material can withstand the considerable heat and pressure generated by the jet vapor system 1000. For example, the various flanges and body sections of the jet vapor system 1000 they made of stainless steel. The water line or lance 1044 as well as the flow straightener plates and after cooler plates 1056 may be made of an alloy material. In preferred embodiments, the stainless steel may be Grade 316L stainless steel or the like and the alloy may be Incoloy® alloy (e.g., Incoloy® 800) or the like. Chrome-molybdenum (or "chrome-moly") may also be used depending on the specific component and requirements of the particular application.

Similarly, any suitable dimensions may be used for the various components of the jet vapor system 1000 based on the requirements of the particular application. In one exemplary implementation, the combustor section 1004 may be a Schedule 160 pipe having a length of about 70 inches to about 90 inches and preferably about 78 inches, as well as the appropriate inner and outer diameters for such a pipe (e.g., 10.6 inches, 12.75 inches, respectively). In another exemplary implementation, the internal cooling channels 1050 may each be about 0.3 to about 0.4 inches in diameter and preferably about 0.315 inches. In yet another exemplary implementation, the water line or lance 1044 may have a diameter of about 0.5 to 1.5 inches and preferably about 1 inch. Similarly, the air intake 1022 may be a 2-inch pipe in some embodiments, and the opening in the outlet downstream flange 1042 may be about 3 inches.

Operation of the jet vapor system 1000 is similar to operation of the previously discussed embodiments except for the use of the regenerative cooling technique instead of a refractory. In general, for one exemplary implementation, diesel fuel may be injected into the jet vapor system 1000 via the fuel line 1020, for example, at 0.1 psi and preheated to 80 to 130 degrees Fahrenheit, while air may be injected into the jet vapor system 1000 via the air intake 1022, for example, at 1.44 psi and 140 degrees Fahrenheit. Sufficient water or coolant should be injected into the coolant intake 1032 to maintain the inner wall of the combustor body 1026 between 600 to 700 degrees Fahrenheit. To this end, the orifice insert should be configured so as to create about 1 to 10 psi of pressure drop between the upstream openings of the internal cooling channels 1050 and the downstream openings of the internal cooling channels 1050. The water line or lance 1044 should inject six to seven gallons per minute of water into the combustor section 1004, and the pressure within the combustor section 1004 is expected to be about 800 psi. Of course, these parameters may be modified by those having ordinary skill in the art as needed for a specific application without departing from the scope of the disclosed embodiments.

Figure 19:
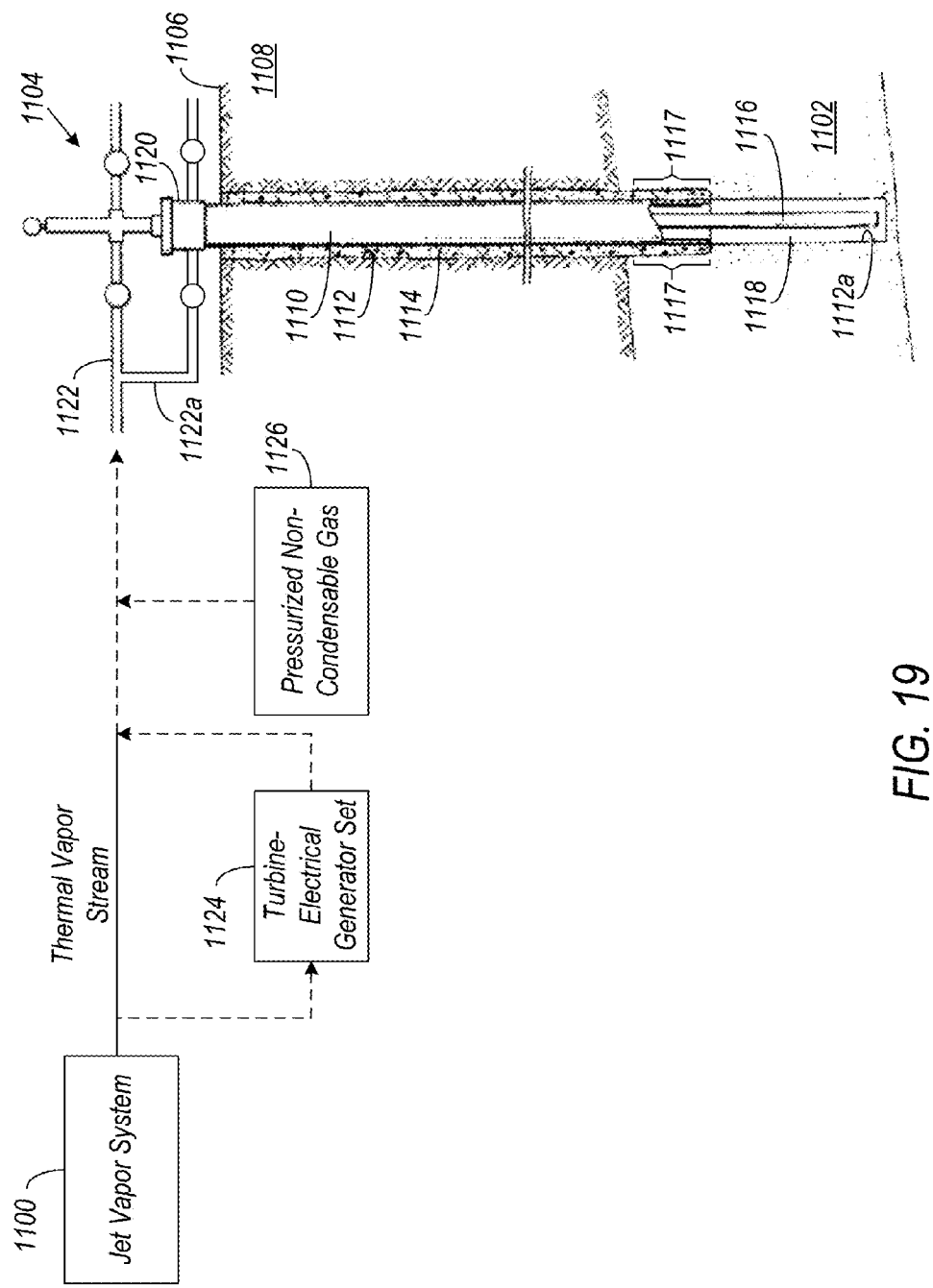
FIG. 19 illustrates the exemplary jet vapor systems herein being used in an enhanced oil recovery process according to the disclosed embodiments.

As alluded to earlier, the thermal vapor stream from the jet vapor systems disclosed herein are particularly useful in enhanced recovery processes involving petroleum from certain types of formations and having certain types of viscosities. Preferably the oil-bearing formations involved are about 200 feet deep to about 3000 feet deep, but the enhanced recovery processes using the thermal vapor stream from the jet vapor systems disclosed herein are applicable to shallower and deeper formations as well. Following now is a description of a few examples of such enhanced recovery processes with reference to FIG. 19.

As can be seen, such enhanced recovery processes typically involve using any one of the jet vapor systems disclosed herein or hereafter to inject a high-pressure stream of thermal vapor comprising superheated steam, carbon dioxide, and nitrogen into a subsurface petroleum-bearing formation 1102 via a well 1104 drilled through the surface 1106 of the earth 1108. The well 1104 preferably has been completed in a conventional manner that includes a string of casing 1110 being set within a bore hole 1112 and supported by a high-temperature cement sheath 1114. The bore hole 1112 may be left open, as in an open-hole completion, or it may have a screen slotted liner or other perforated device (not shown) set in the lower end 1112a of the bore hole 1112 to support the walls of the bore hole 1112. The well 1104 may also include a string of tubing 1116 disposed within the casing 1110 to thereby form an annulus 1118 therebetween. Perforations 1117 may be provided or created near the lower end of the casing 1110 in a manner known to those having ordinary skill in the art. A well head 1120 and conventional sealing device (not shown) is provided adjacent the top of the well 1104 to seal off the top of the annulus 1118 and maintain pressure within the well 1104. A jet vapor system 1100 may then be selectively connected to the tubing 1116 and/or the casing 1110 via the well head 1120 to inject the high-pressure thermal vapor stream down the tubing 1116 and/or the casing 1110 as needed.

In some embodiments, the high-pressure thermal vapor stream may be also provided to a gas turbine-electrical generator set 1124 for cogeneration of electricity and heating fuel, water, and/or other material as needed. In some embodiments, pressurized non-condensable gases, such as nitrogen, carbon dioxide, and the like, or a mixture thereof, from a non-condensable gas supply 1126 may be mixed with the thermal vapor stream for injection into the casing 1110 and/or the tubing 1116. The above arrangements allow the thermal vapor stream from the jet vapor system 1100 to be used in a variety of applications and processes, including various enhanced oil recovery processes.

As an example, in some embodiments, the above arrangement may be used to perform a huff and puff recovery process that, unlike the conventional or typical huff and puff process, does not require any "soak" time. In this continuous huff and puff recovery process, the thermal vapor stream may first be injected into the bore hole 1112 through the tubing 1116, followed by a predefined number (e.g., two, four, etc.) of cycles of conventional huff and puff. Because gas has significantly more relative permeability (e.g., 20 or more times) than fluid for penetrating the formation 1102, the mixture of thermal vapor and non-condensable gases is better able to penetrate and heat the petroleum in the formation, thereby reducing the oil's viscosity and increasing its mobility, forcing it down toward the bottom of the bore hole 1112 where it may be collected and extracted through the tubing 1116 using standard techniques.

In some embodiments, the thermal vapor stream from the jet vapor system 1100 may be used to reduce heat loss on thermal fluids that are injected into the well 1104. Such thermal fluids, or in some cases, the thermal vapor discussed herein, are often injected down the tubing 1116 as part of certain enhanced oil recovery processes. However, water and/or oil from the formation 1102 may sometimes enter the annulus 1118 and accumulate between the casing 1110 and the tubing 1116. The water and/or oil in the annulus 1118 act as a thermal conductor to absorb heat from the thermal fluid (or the thermal vapor) being injected down the tubing 1116, potentially reducing the efficacy of the thermal fluid (or the thermal vapor). Therefore, in some embodiments, the jet vapor system 1100 may be used to inject a high-pressure stream of thermal vapor down the annulus 1118 to push or force out any water and/or oil that may have accumulated therein. This arrangement helps prevent or minimize heat in the thermal fluids (or the thermal vapor discussed herein) from being loss as they are injected down the tubing 1116.

In some embodiments, the thermal vapor stream from the jet vapor system 1100 may also be used to improve oil recovery in conventional steam flood recovery processes. In a typical 7-spot steam flood arrangement, for example, six production wells are substantially evenly spaced about a circular pattern and one injection well is located at the center of the pattern. High pressure steam is then injected down the injection well and into the petroleum-bearing formation where it condenses into hot fluid that pushes any oil in the formation radially outward toward the production wells. One shortcoming of the above technique is that, depending on the distance between the injection well and the production wells, and other factors, it may be months before the oil in the formation actually reaches the production wells. Another shortcoming is that historically, even in the best scenarios, only about 30 percent of the oil is actually recovered from the formation before the production ceases to be economical. Moreover, petroleum-bearing formations that are less than about 50 feet in height, which accounts for a large percentage of the heavy oil reserves in the United States, have historically not proven profitable using the above conventional steam flood technique.

In accordance with the disclosed embodiments, the jet vapor system 1100 may be used to inject a high-pressure stream of thermal vapor (i.e., combustion gases and superheated steam) into the six production wells. The stream of thermal vapor may be injected down the casing 1110, the tubing 1116, or both, for each production well. The injection may occur at a pressure and temperature that is higher than the formation pressure and temperature (e.g., about 350-500 psi and about 500 degrees Fahrenheit), but less than the fracture gradient pressure. As mentioned earlier, because this high-pressure stream of hot gases has roughly 20 times better relative permeability compared to hot fluid, it is better able to penetrate into the formation. And because the high-pressure stream of gases contains a greater amount of heat than the hot fluid (vaporization causes the highest amount of heat to be contained in the least amount of water), more heat is transferred to the oil in the formation, lowering the viscosity thereof. This results in greater oil mobility that leads to faster production and increased production rates. It has been observed, for example, that oil production was able to start more quickly using the disclosed embodiments relative to the traditional steam flood method when the high-pressure stream of gases was injected into the production wells for a period of between 12 to 24 hours, based on the thickness of the formation, prior to starting the traditional steam flood method. Additional injections of the high-pressure stream of gases may be performed as needed. Similarly, a different number of productions wells besides six (e.g., four, five, seven, etc.) may be used as needed by those having ordinary skill in the art.

In some embodiments, the thermal vapor stream from the jet vapor system 1100 may be used to perform preheating of the oil well to near the superheat temperature of steam. Steam reaches the superheat point at different temperatures depending on the steam's pressure. At a pressure of 250 psi, for example, the superheat temperature of steam is 400 degrees Fahrenheit, whereas at 350 psi, it is 431 degrees Fahrenheit, and at 500 psi, it is 467 degrees Fahrenheit.

In accordance with the disclosed embodiments, the well 1104 may be preheated to near the superheat temperature of steam by injecting a high-pressure stream of thermal vapor from the jet vapor system 1100 down the casing 1110. The stream of thermal vapor is allowed to travel through the casing 1110 down the bore hole 1112, back up the tubing 1116, and subsequently discharged in an appropriate manner. The thermal vapor injection is continued until the discharge stream from the tubing 1116 is substantially free of water condensation (e.g., less than 1 percent water condensation), at which point the casing 1110 and the tubing 1116 are at or near the superheated steam temperature. Thereafter, injection of thermal vapor down the casing 1110 is stopped and injection of the thermal vapor down the tubing 1116 and into the formation is started to heat and thereby decrease the viscosity of the oil in the formation. Any thermal vapor or superheated gas trapped between the casing 1110 and the tubing 1116 acts as an insulator to help prevent heat loss from the thermal vapor in the tubing 1116. In one example, the injection of the thermal vapor down the tubing 1116 is performed for 12 to 24 hours, after which time the flow of the tubing 1116 is reversed and oil from the formation is produced up the tubing 1116. The above preheating process may be repeated as needed when the oil from the formation stops flowing or the production rate decreases to a predefined level.

In some embodiments, the thermal vapor stream from the jet vapor system 1100 may be used to reduce the effect of biodiversity in certain petroleum-bearing formations. Biodiversity refers to the presence of multiple types or forms of hydrocarbon in the petroleum-bearing formation. For example, paraffin ($C_{20}H_{42}$) is a long chain hydrocarbon often found in crude oil bearing formations that increases the biodiversity of the formation. The paraffin can present problems in the production of the crude oil because it tends to settle out as the temperature of the crude oil drops, solidifying into a waxy substance that can plug up the bore hole and/or the tubing string. The temperature at which paraffin begins to solidify is defined as the cloud point of the oil and may vary from well to well for a given formation.

In accordance with the disclosed embodiments, the jet vapor system 1100 may be used to inject a high-pressure stream of thermal vapor into the formation 1102. The stream of thermal vapor may be injected down the casing 1110, the tubing 1116, or both, and may be mixed with a non-condensable gas, such as carbon dioxide and/or nitrogen. As in previous embodiments, the injection may occur at a pressure and temperature that is higher than the formation pressure and temperature (e.g., about 350-500 psi and about 500 degrees Fahrenheit), but less than the fracture gradient pressure. Due to their greater relative permeability, the gases are better able to penetrate into the pores of the formation. The high pressure at which the gases are injected into the formation pushes the oil and the paraffin contained therein into the pores with enough force to cause the paraffin to shear into smaller particles that stay suspended in the crude oil. And the presence of the high relative permeability non-condensable gas helps ensure that the shearing takes place deep within the formation. This has the effect of homogenizing the paraffin, thereby reducing the biodiversity of the crude oil. Once the paraffin has been thusly homogenized, it does not settle out or solidify again, even when the temperature of the crude oil drops below the cloud point temperature. In one example, a paraffin clogged well that was cleaned and subsequently injected in the manner described above for a period of four hours was thereafter observed to produce about seven barrels of oil and about 11 barrels of water a day for 30 days, whereas the well previously produced about one-half barrels of oil and about 50 barrels of water a day.

In some embodiments, the thermal vapor stream from the jet vapor system 1100 may be used to increase carbonic acid in primarily limestone-based oil formations. In such formations, oil is commonly trapped in and between the pores of the limestone, making it difficult to extract and produce the oil. Dissolving the limestone can help release the oil from the pores and allow it to move more freely in the formation. Carbonic acid ($H_2CO_3$), which may be formed when carbon dioxide is combined with water, is known to be very effective in dissolving limestone due to its lower pH (about 3.5 pH). Increasing the pressure in the formation can further increase the acidity of the carbonic acid (e.g., to about 3 pH).

In accordance with the disclosed embodiments, the jet vapor system 1100 may be used to increase the amount of carbonic acid in a petroleum bearing formation. For example, a high-pressure stream of thermal vapor from the jet vapor system 1100 may be injected down the casing 1110, the tubing 1116, or both, and into the formation in a similar manner to that described earlier. This stream of thermal vapor, which already includes carbon dioxide as well as superheated steam and nitrogen, may be further infused with carbon dioxide (e.g., from a compressed external supply) to increase the amount of carbon dioxide injected into the formation. The additional carbon dioxide helps further reduce the viscosity of the oil, as noted previously herein, and can also help promote or otherwise increase production of carbonic acid in the formation via the superheated steam as it condenses into water. And as before, the injection may take place at a pressure and temperature that is higher than the formation pressure and temperature (e.g., about 350-500 psi and about 500 degrees Fahrenheit), but less than the fracture gradient pressure. The carbonic acid resulting from the additional carbon dioxide helps dissolve the limestone in the formation to allow the oil therein to move more freely.

Figure 20:
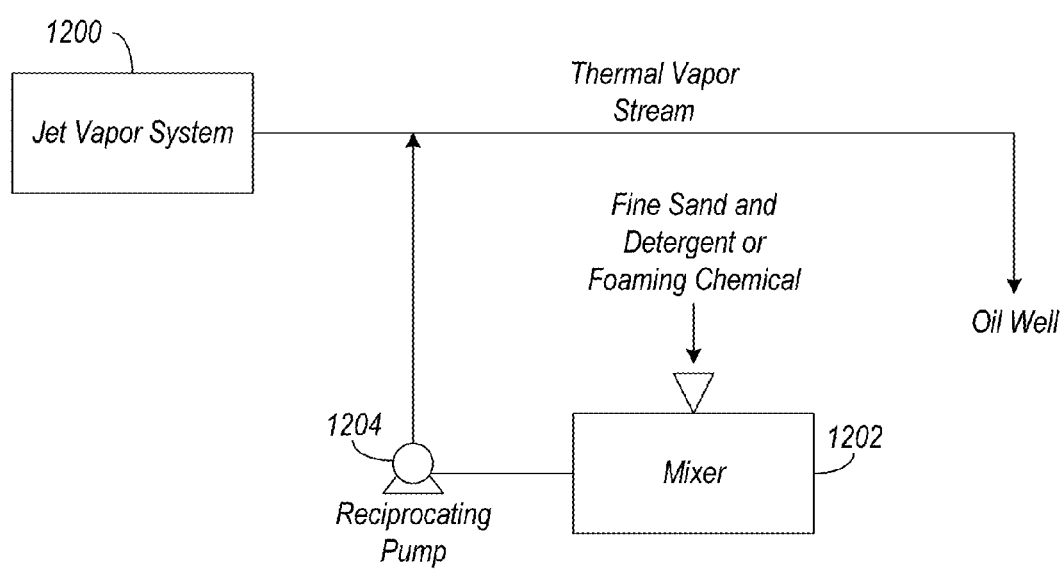
FIG. 20 illustrates the exemplary jet vapor systems herein being used in another enhanced oil recovery process according to the disclosed embodiments.

FIG. 20 illustrates the exemplary jet vapor systems disclosed herein being used in another enhanced oil recovery process according to aspects of the invention. In this enhanced oil recovery process, a jet vapor system 1200 and according to aspects of the invention may be used to generate a thermal vapor stream (containing superheated steam, carbon dioxide, and nitrogen) for fracturing a formation. In this implementation, fine grains of sand or other suitable particles having about 110 to 200 mesh is mixed with a high-temperature detergent or foaming chemical in a mixer 1202. The resulting mixture is then fed to a reciprocating pump 1204 that pumps the mixture into the thermal vapor stream. In some embodiments, the reciprocating pump 1204 may also be used to boost the pressure of the thermal vapor stream from about 350 psi up to near 3000 psi and even 5000 psi in some cases, depending the particular formation. The thermal vapor stream containing the mixture of fine sand or other suitable particles and high-temperature detergent or foaming chemical is then injected under high pressure into the formation. The high pressure from the thermal vapor stream helps create small fractures in the formation that allow the fine sand or other suitable particles to enter the pores in the formation. Once in the formation, the fine sand or other suitable particles help prop up the pores of the formation, making it possible and easier to inject a higher volume of superheated water gas into the formation. The sand propping up the pores also allows oil, which has now been heated by the superheated water gas, to more easily flow back toward the well.

Figure 21:
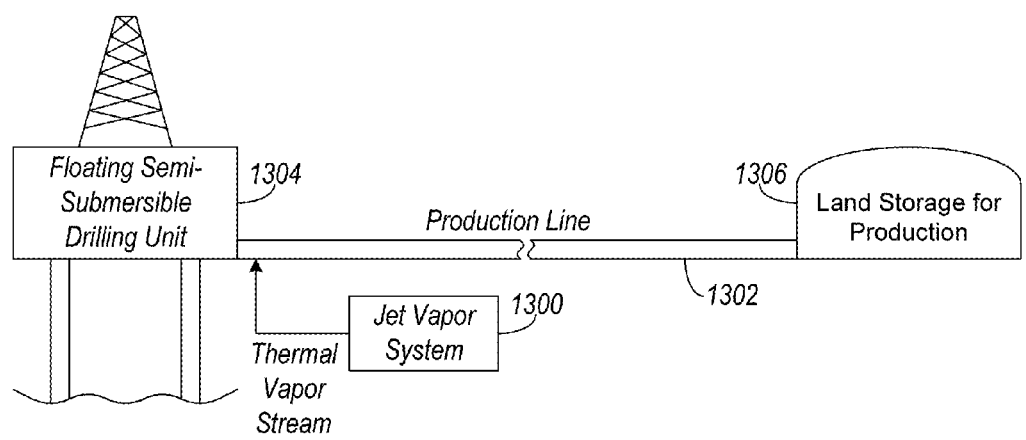
FIG. 21 illustrates the exemplary jet vapor systems herein being used in a pipeline cleaning process according to the disclosed embodiments.

FIG. 21 illustrates the exemplary jet vapor systems disclosed herein being used in a pipe cleaning operation. In this operation, a jet vapor system 1300 according to aspects of the invention is used to clean a crude oil production pipeline 1302 extending from an offshore semi-submersible drilling unit 1304. Such a production pipeline 1302 is typically used to carry crude oil from the offshore semi-submersible drilling unit 1304 to an onshore or land-based storage facility 1306 for subsequent processing. Over time, paraffin may build up in the pipeline 1302, causing the crude carrying capacity of the pipeline 1302 to decrease.

In accordance with the disclosed embodiments, the jet vapor system 1300 may be used to clean the pipeline 1302 of the paraffin by melting or otherwise dissolving the paraffin and pushing the paraffin out of the pipeline 1302. As a preliminary step, the jet vapor system 1300 may be used to verify that the pipeline 1302 has not been completely plugged (e.g., with paraffin) by pumping only air (i.e., no combustion) into the end of the pipeline 1302 located at the semi-submersible drilling unit 1304 and checking the other end for proper outflow. After verifying the pipeline 1302 has not been completely plugged, combustion may be initiated in the jet vapor system 1300 and a stream of thermal vapor comprising superheated steam, carbon dioxide, and nitrogen may be injected into the pipeline 1302. The thermal vapor injection may begin slowly with a small amount of thermal vapor at first, then steadily increased while the other end of the pipeline 1300 is checked for proper outflow. Care should be taken not to inject too much thermal vapor into the pipeline 1302 too soon, as this may push too much paraffin too quickly down the pipeline, potentially plugging up the pipeline with paraffin. The optimal amount of thermal vapor injected and the duration of the injection may be adjusted as needed depending on the particular application, but in general, once paraffin begins to be pushed out of the pipeline, no further increase in the amount of thermal vapor injected is needed. Such an arrangement provides an efficient and effective way of removing the paraffin that may have built up in the pipeline 1302 over time.

While the disclosed aspects of the invention have been described with reference to one or more specific implementations, those skilled in the art will recognize that many changes may be made. Accordingly, each of the foregoing embodiments and obvious variations thereof is contemplated as falling within the spirit and scope of the different aspects of the invention, which are set forth in the following claims.

What is claimed is:

1. An apparatus for generating a high-pressure stream of superheated vapor, nitrogen, and carbon dioxide, comprising:
   an inlet section configured to receive fuel and air containing a stoichiometric or near stoichiometric amount of oxygen for the fuel;
   a combustor section adjacent to and coaxial with the inlet section and configured to confine therein substantially stoichiometric combustion of the fuel and air to produce combustion gases, the combustor section including:
   i) a tubular combustor body having an inner wall and an outer wall;
   ii) a plurality of internal cooling channels extending along the length of the tubular combustor body between the inner wall and the outer wall of the combustor body;
   iii) an upstream coolant manifold in fluid communication with the internal cooling channels and configured to receive and distribute coolant into the internal cooling channels; and
   iv) a water line mounted within the tubular combustor body and configured to introduce water onto the combustion gases to produce superheated steam;
   an outlet section adjacent to and coaxial with the combustor section, the outlet section having an outlet for allowing the superheated steam and combustion gases to exit the combustion chamber; and
   one or more after cooler plates mounted coaxially within the combustor body, each after cooler plate having a plurality of tabs along an outer edge thereof configured to create gaps between the after cooler plate and the inner wall of the combustor body through which the combustion gases flow.

2. The apparatus of claim 1, wherein the fuel is a short or long chain hydrocarbon product, the short or long chain hydrocarbon product including one of the following: methane, diesel, crude oil, diesel-crude mixture, kerogen, and coal powder.

3. The apparatus of claim 1, wherein the substantially stoichiometric combustion results in less than one-half of one percent unburned oxygen.

4. The apparatus of claim 1, further comprising an orifice insert mounted within each internal cooling channel at an upstream opening thereof and configured to create a pressure drop between the upstream opening and the downstream opening of the internal cooling channel.

5. The apparatus of claim 1, wherein the coolant in the internal cooling channels is water, further comprising a downstream coolant manifold in fluid communication with the internal cooling channels and configured to receive the water from the internal cooling channels and provide the water to the water line mounted within the tubular combustor body.

6. The apparatus of claim 1, wherein the inner wall of the combustor body is exposed to direct contact by the combustion gases.

* * * * *